(12) United States Patent　　　(10) Patent No.: US 12,580,760 B2

Trevethan　　　(45) Date of Patent: Mar. 17, 2026

---

(54) SMART CONTRACT EXECUTION USING DISTRIBUTED COORDINATION

(71) Applicant: nChain Licensing AG, Zug (CH)

(72) Inventor: Thomas Trevethan, London (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 16/649,514

(22) PCT Filed: Sep. 14, 2018

(86) PCT No.: PCT/IB2018/057056

§ 371 (c)(1),
(2) Date: Mar. 20, 2020

(87) PCT Pub. No.: WO2019/058240

PCT Pub. Date: Mar. 28, 2019

(65) Prior Publication Data

US 2020/0313884 A1　　Oct. 1, 2020

(30) Foreign Application Priority Data

Sep. 22, 2017 (GB) ....................................... 1715423
Sep. 28, 2017 (GB) ....................................... 1715701

(51) Int. Cl.
　*H04L 9/14*　　(2006.01)
　*G06Q 10/10*　　(2023.01)
　　(Continued)

(52) U.S. Cl.
　CPC ............... *H04L 9/14* (2013.01); *G06Q 10/10* (2013.01); *G06Q 20/085* (2013.01); (Continued)

(58) Field of Classification Search
None
See application file for complete search history.

(56) References Cited

U.S. PATENT DOCUMENTS 10,535,111 B2　1/2020　O'Brien
10,778,439 B2 *　9/2020　Cheng .................... H04L 9/0643
(Continued)

FOREIGN PATENT DOCUMENTS

CN　　106204287 A　12/2016
FR　　　3049137 A1　9/2017
(Continued)

OTHER PUBLICATIONS

Y. Sun, G. Li, Z. Lin, F. Xiao and X. Yang, "A completely fair secret sharing scheme without dealer," 2016 IEEE International Conference on Consumer Electronics-Taiwan (ICCE-TW), 2016, pp. 35-36, doi: 10.1109/ICCE-TW.2016.7520905. (Year: 2016).*

(Continued)

*Primary Examiner* — Amir Mehrmanesh
*Assistant Examiner* — Shadi H Kobrosli
(74) *Attorney, Agent, or Firm* — Tarolli, Sundheim, Covell & Tummino LLP

(57) ABSTRACT

Computer-implemented methods for smart contract outcome determination are described. Assent to determine an outcome of a set of conditions is communicated to a set of counterparties, with the set of conditions having a first possible outcome and a second possible outcome. A first private key share corresponding to the first possible outcome and a second private key share corresponding to the second possible outcome are generated using a secret sharing protocol. An amount of a digital asset is transferred to an address associated with a first blockchain transaction. As a result of determining the outcome to be the first possible outcome, the first private key share is revealed within a particular time frame, with the first private key share usable, at least in part, by the set of counterparties to determine the outcome. The blockchain transaction is caused to be validated at a node in a blockchain network.

20 Claims, 8 Drawing Sheets

(51) Int. Cl.

| | | |
|---|---|---|
| *G06Q 20/08* | (2012.01) | |
| *G06Q 20/10* | (2012.01) | |
| *G06Q 20/12* | (2012.01) | |
| *G06Q 20/38* | (2012.01) | |
| *G06Q 20/40* | (2012.01) | |
| *G06Q 30/018* | (2023.01) | |
| *G06Q 40/02* | (2023.01) | |
| *H04L 9/00* | (2022.01) | |
| *H04L 9/08* | (2006.01) | |
| *H04L 9/30* | (2006.01) | |
| *H04L 9/32* | (2006.01) | |

(52) U.S. Cl.

CPC ....... *G06Q 20/108* (2013.01); *G06Q 20/1235* (2013.01); *G06Q 20/38215* (2013.01); *G06Q 20/3829* (2013.01); *G06Q 20/401* (2013.01); *G06Q 30/0185* (2013.01); *G06Q 40/02* (2013.01); *H04L 9/085* (2013.01); *H04L 9/0861* (2013.01); *H04L 9/30* (2013.01); *H04L 9/3242* (2013.01); *G06Q 2220/00* (2013.01); *H04L 9/50* (2022.05); *H04L 2209/16* (2013.01); *H04L 2209/56* (2013.01)

(56) References Cited

U.S. PATENT DOCUMENTS

| | | | | |
|---|---|---|---|---|
| 11,057,198 | B2 * | 7/2021 | Linder | G06Q 20/3827 |
| 11,239,994 | B2 * | 2/2022 | Bowman | H04L 63/0823 |
| 11,282,139 | B1 * | 3/2022 | Winklevoss | G06Q 40/04 |
| 11,315,193 | B1 | 4/2022 | Kim | |
| 11,392,955 | B2 | 7/2022 | Thomas et al. | |
| 11,514,448 | B1 * | 11/2022 | Liberman | G06Q 20/401 |
| 2001/0049616 | A1 | 12/2001 | Khuzadi et al. | |
| 2007/0118449 | A1 | 5/2007 | De La Motte | |
| 2013/0046983 | A1 * | 2/2013 | Zhu | H04W 12/069 |
| | | | | 713/171 |
| 2013/0304599 | A1 | 11/2013 | Vincent | |
| 2014/0058968 | A1 | 2/2014 | Booth | |
| 2014/0304262 | A1 | 10/2014 | Makki et al. | |
| 2015/0244690 | A1 | 8/2015 | Mossbarger | |
| 2015/0379510 | A1 | 12/2015 | Smith | |
| 2016/0162897 | A1 | 6/2016 | Feeney | |
| 2016/0217532 | A1 | 7/2016 | Slavin | |
| 2016/0342988 | A1 | 11/2016 | Thomas et al. | |
| 2017/0046664 | A1 | 2/2017 | Haldenby et al. | |
| 2017/0048235 | A1 | 2/2017 | Lohe et al. | |
| 2017/0085545 | A1 | 3/2017 | Lohe et al. | |
| 2017/0103472 | A1 | 4/2017 | Shah | |
| 2017/0155515 | A1 | 6/2017 | Androulaki et al. | |
| 2017/0180134 | A1 * | 6/2017 | King | H04L 63/0823 |
| 2017/0213210 | A1 | 7/2017 | Kravitz | |
| 2017/0230189 | A1 * | 8/2017 | Toll | H04L 9/0618 |
| 2017/0237554 | A1 * | 8/2017 | Jacobs | G06F 21/64 |
| | | | | 713/171 |
| 2017/0243193 | A1 * | 8/2017 | Manian | G06Q 20/3829 |
| 2017/0249637 | A1 | 8/2017 | Tribak Lyedri et al. | |
| 2017/0287068 | A1 | 10/2017 | Nugent | |
| 2017/0287090 | A1 | 10/2017 | Hunn et al. | |
| 2017/0301031 | A1 | 10/2017 | Naqvi | |
| 2018/0005186 | A1 | 1/2018 | Hunn | |
| 2018/0019984 | A1 | 1/2018 | Isaacson et al. | |
| 2018/0025442 | A1 * | 1/2018 | Isaacson | H04L 51/48 |
| | | | | 705/26.62 |
| 2018/0240107 | A1 * | 8/2018 | Andrade | G06Q 20/36 |
| 2018/0260921 | A1 * | 9/2018 | Wagstaff | H04L 9/3236 |
| 2018/0278594 | A1 * | 9/2018 | Schiffman | H04L 9/3255 |
| 2018/0365686 | A1 | 12/2018 | Kondo | |
| 2019/0043043 | A1 * | 2/2019 | Saraniecki | H04L 9/3268 |
| 2019/0080299 | A1 * | 3/2019 | Thom | H04L 9/088 |
| 2019/0081796 | A1 * | 3/2019 | Chow | G06Q 20/34 |
| 2019/0164137 | A1 * | 5/2019 | Vincent | H04L 9/0643 |
| 2019/0213564 | A1 * | 7/2019 | Chan | H04L 63/062 |
| 2019/0244227 | A1 * | 8/2019 | Inoue | H04L 63/0428 |

| | | | | |
|---|---|---|---|---|
| 2020/0213125 | A1 * | 7/2020 | Destefanis | H04L 63/10 |
| 2020/0234386 | A1 * | 7/2020 | Blackman | H04L 9/30 |
| 2020/0311678 | A1 | 10/2020 | Fletcher et al. | |
| 2020/0313884 | A1 | 10/2020 | Trevethan | |
| 2020/0327498 | A1 * | 10/2020 | Weber | G06Q 20/0655 |
| 2020/0351083 | A1 * | 11/2020 | Bartolucci | H04L 9/3247 |
| 2021/0082044 | A1 | 3/2021 | Sliwka et al. | |
| 2021/0097187 | A1 | 4/2021 | Guyomarc'h et al. | |
| 2021/0336956 | A1 * | 10/2021 | Bitauld | H04L 9/3239 |
| 2025/0182024 | A1 * | 6/2025 | Sheikh | G06Q 20/02 |

FOREIGN PATENT DOCUMENTS

| | | | | |
|---|---|---|---|---|
| WO | 0205115 | A2 | 1/2002 | |
| WO | 2017145007 | A1 | 8/2017 | |
| WO | 2017151861 | A1 | 9/2017 | |
| WO | 2017190795 | A1 | 11/2017 | |
| WO | WO-2018127511 | A1 * | 7/2018 | G06F 21/6209 |

OTHER PUBLICATIONS

Edgar, Edmund. [ANN] Reality Keys: An oracle letting you use external state in transactions. https://bitcointalk.org/index.php?topic= 423638.0;all. 2014 (Year: 2014).*

Goldfeder, Steven and Arvind Narayanan. "Securing Bitcoin wallets via a new DSA / ECDSA threshold signature scheme." pp. 1-26 (Year: 2015).*

Goldfeder, Steven et al. "Escrow Protocols for Cryptocurrencies: How to Buy Physical Goods Using Bitcoin." Financial Cryptography. pp. 1-27 (Year: 2017).*

Waclaw Banasik, Stefan Dziembowski, and Daniel Malinowski; Efficient Zero-Knowledge Contingent Payments in Cryptocurrencies Without Scripts; pp. 1-25 (Year: 2016).*

Marcin Andrychowicz, Stefan Dziembowski, Daniel Malinowski, and Łukasz Mazurek; Fair Two-Party Computations via Bitcoin Deposits; pp. 1-15 (Year: 2013).*

Andresen, "Bit-thereum," GavinTech, Jun. 9, 2014 [retrieved Feb. 20, 2018], http://gavintech.blogspot.co.uk/2014/06/bit-thereum. html#!/2014/06/bit-thereum.html, 11 pages.

Antonopoulos, "Mastering Bitcoin—Unlocking Digital Cryptocurrencies," O'Reilly Media, Inc., Dec. 20, 2014, 282 pages.

Arhag, "Re: Can Bitshares incorporate an ACTUAL decentralized exchange?," Bitsharetalk, Jan. 10, 2015 [retrieved Feb. 20, 2018], https://bitsharestalk.org/index.php?topic=13101. msg171855#msg171855, eight pages.

Belcher, "Payment Channel Payouts: An Idea for Improving P2Pool Scalability," retrieved from https://bitcointalk.org/index.php?topic= 2135429.0, Aug. 2017, 14 pages.

Bitcoin Wiki, "Contract," retrieved from https://en.bitcoin.it/wiki/Contract, Jan. 5, 2017, 12 pages.

Bitshares, "Delegated Proof-of-Stake Consensus," May 7, 2017, https://web.archive.org/web/20161102133058/https://bitshares.org/technology/delegated-proof-of-stake-consensus, 5 pages.

Buterin, "Ethereum and Oracles," Ethereum Blog, Jul. 22, 2014 [retrieved Feb. 5, 2018], https://blog.ethereum.org/2014/07/22/ethereum-and-oracles/, 16 pages.

Buterin, "SchellingCoin: A Minimal-Trust Universal Data Feed," Ethereum Blog, Mar. 28, 2014, 7 pages.

Edgar, "bymycoins.github.io / js / bitcore_monkey_patches.js," Aug. 8, 2014 [retrieved Feb. 20, 2018], https://github.com/bymycoins/bymycoins.github.io/blob/5031b3fbfce9c35d8eeae3825c8c2d784781466f/js/bitcore_monkey_patches.js#L30, seven pages.

Edgar, "Reality Keys: Reality Keys and Peer-to-peer Contracts," KK Social Minds, Aug. 8, 2014 [retrieved Feb. 12, 2018], www. socialminds.jp/realitykeys/slides, 21 pages.

Edgar, "RealityKeys-Examples," retrieved from https://github.com/edmundedgar/realitykeys-examples/blob/master/realitykeysdemo. py, Jun. 13, 2015, 9 pages.

Edmundedgar, "[ANN] Reality Keys: An Oracle Letting You use External State in Transactions," retrieved from https://bitcointalk. org/index.php?topic=423638.0, Jan. 20, 2014, 7 pages.

(56) References Cited

OTHER PUBLICATIONS

Ellis et al., " ChainLink: A Decentralized Oracle Network," Sep. 4, 2017 [retrieved Feb. 5, 2018], https://link.smartcontract.com/whitepaper, 38 pages.

Goldfeder et al., "Escrow Protocols for Cryptocurrencies: How to Buy Physical Goods Using Bitcoin," retrieved from http://stevengoldfeder.com/papers/escrow.pdf, Jul. 26, 2018, 27 pages.

Goldfeder et al., "Securing Bitcoin Wallets via a New DSA/ECDSA Threshold Signature Scheme," retrieved from https://www.cs.princeton.edu/~stevenag/threshold_sigs.pdf, 26 pages.

Goldfeder et al., "Securing Bitcoin wallets via threshold signatures" Princeton's Center for Information Technology Policy, Mar. 28, 2014, 11 pages.

Ibrahim, "Efficient Dealer-Less Threshold Sharing of Standard RSA," International Journal of Network Security,8(2): Mar. 2009, 12 pages.

International Search Report and Written Opinion mailed Dec. 13, 2018, Patent Application No. PCT/IB2018/057056, 10 pages.

International Search Report and Written Opinion mailed Dec. 13, 2018, Patent Application No. PCT/IB2018/057058, 10 pages.

Kudos, "The Blockchain Protocol for Trusted Ratings and Performance Driven Rewards," 2018, 27 pages.

Kudos, "The Kudos Project," retrieved from https://www.kudosproject.com/, 2017, 8 pages.

Lina, "Blockchain Based Review Platform," Lina Network, Jan. 1, 2018, 23 pages.

Nakamoto, "Bitcoin: A Peer-to-Peer Electronic Cash System," Bitcoin, Oct. 31, 2008, https://bitcoin.org/bitcoin.pdf, 9 pages.

Orisi, "Orisi White Paper," retrieved from https://github.com/orisi/wiki/wiki/Orisi-White-Paper, Nov. 29, 2014, 5 pages.

Poon, "Sighash_Noinput in Segregated Witness," retrieved from https://bitcoin-development.narkive.com/ByYWXcxA/sighash-noinput, 2016, 7 pages.

Pratyush et al., "Efficient Weighted Threshold ECDSA for Securing Bitcoin Wallet," Isea Asia Security and Privacy, 2017, 9 pages.

Reality Keys, "Crowd-Sourced Verification for Smart Contracts," retrieved from https://www.realitykeys.com/, 2012, 5 pages.

Revain, "New Generation Feedback Platform Based on the Blockchain Technology," Revain Technologies Inc, 2017, 24 pages.

Rikken, "BPM and Blockchain, miles apart or closer than you think?" retrieved from https://www.bpmleader.com/2015/11/17/bpm-blockchain-miles-apart-closer-think/, 2015, 3 pages.

Satoshi et al., "Connection Limits," Bitcoin Forum, Aug. 9, 2010, https://bitcointalk.org/index.php?topic=741.0;prev_next=prev, 2 pages.

Schwartz et al., "Smart Oracles: A Simple, Powerful Approach to Smart Contracts," Codius, Jul. 17, 2014 [retrieved Feb. 5, 2018], https://github.com/codius/codius/wiki/Smart-Oracles:-A-Simple,-Powerful-Approach-to-Smart-Contracts, 13 pages.

Sia, "Schellling Points, Prediction Markets, and Consensus," retrieved from https://web.archive.org/web/20160305135439/http://blog.sia.tech/2015/11/30/the-limitationsof- schelling-points/, Nov. 30, 2015, 6 pages.

Singh et al., "Efficient Weighted Threshold ECDSA for Securing Bitcoin Wallet," 2017 ISEA Asia Security and Privacy (ISEASP), http://ieeexplore.ieee.org/document/7976994/, Jan. 29, 2017, 10 pages.

Stathakopoulou et al., "Threshold Signatures for Blockchain Systems," IBM Research Report, Apr. 4, 2017, 42 pages.

Todd, "[bitcoin-dev] Building Blocks of the State Machine Approach to Consensus," petertodd.org, Jun. 20, 2016, https://lists.linuxfoundation.org/pipermail/bitcoin-dev/2016-June/012773.html, six pages.

Todd, "CoinCovenants using SCIP Signatures, an Amusingly Bad Idea," retrieved from https://bitcointalk.org/index.php?topic=260898.60, Aug. 2013, 19 pages.

Todd, "Implementing External State Contracts—Feedback Requested," retrieved from https://bitcointalk.org/index.php?topic=260898.60, Aug. 2013, 9 pages.

Torpey, "What is a Bitasset?," CoinJournal, Feb. 26, 2015 [retrieved Feb. 20, 2018], https://coinjournal.net/what-is-a-bitasset/, three pages.

UK Commercial Search Report mailed Feb. 8, 2017, Patent Application No. GB1715701.7, 10 pages.

UK Commercial Search Report mailed Jan. 26, 2018, Patent Application No. GB1715423.8, 11 pages.

UK IPO Search Report mailed Mar. 20, 2018, Patent Application No. GB1715701.7, 8 pages.

UK IPO Search Report mailed Mar. 22, 2018, Patent Application No. GB1715423.8, 10 pages.

Vorick, "Schelling Points, Prediction Markets, and Consensus," Medium, Nov. 30, 2015 [retrieved Feb. 20, 2018], six pages.

Xeroc, "Simple Side-chaining for Graphene-based Blockchains (BitShares/PeerPlays/Steem)," retrieved from https://steemit.com/bitshares/@xeroc/simple-sidechaining-for-graphene-based-blockchains-bitsharespeerplayssteem, 2015, 7 pages.

Zapit, "The Only Blockchain-Verified Product Reviews Platform," 2018, 13 pages.

Zoltu, "When System Redistributes REP from the Bad Reporters?" retrieved from https://augur.stackexchange.com/questions/210/when-systemredistributes-rep-from-the-bad-reporters, Dec. 8, 2017, 1 page.

Edmunedgar, "[ANN] Reality Keys: An oracle letting you use external state in transactions," Bitcoin Forum, Jan. 20, 2014 [retrieved Feb. 5, 2018], https://bitcointalk.org/index.php?topic=423638.0, 12 pages.

Ziegeldorf, J. H. et al.: "CoinParty: Secure Multi-Party Mixing of Bitcoins," Mar. 2, 2015, pp. 75-86 , <DOI:http://dx.doi.org/10.1145/2699026.2699100>.

Goldfeder, Steven et al.: "Escrow Protocols for Cryptocurrencies: How to Buy Physical Goods Using Bitcoin", [online], Jun. 6, 2017, pp. 1-27, [Date of Search: Aug. 23, 2022], on the Internet <URL https://web.archive.org/web/20170606025204/http://stevengoldfeder.com/papers/escrow.pdf>.

* cited by examiner

600

700

SMART CONTRACT EXECUTION USING DISTRIBUTED COORDINATION

FIELD OF INVENTION

This invention relates generally to blockchain technologies, and more particularly to controlling the execution of a blockchain based smart-contract using a combination of dealer-free secret sharing and the properties of elliptic curve arithmetic and signatures. This invention further utilises cryptographic and mathematical techniques to enforce security in relation to electronic transfers conducted over a blockchain network. The invention is particularly suited, but not limited to, use in smart contracts.

BACKGROUND OF INVENTION

In this document the term "blockchain" may refer to any of several types of electronic, computer-based, distributed ledgers. These include consensus-based blockchain and transaction-chain technologies, permissioned and unpermissioned ledgers, shared ledgers and variations thereof. The most widely known application of blockchain technology is the Bitcoin ledger, although other blockchain implementations have been proposed and developed. While the example of Bitcoin may be referred to as a useful application of the technology described in the present disclosure for the purpose of convenience and illustration, Bitcoin is just one of many applications to which the technology described in the present disclosure may be applied. However, it should be noted that the invention is not limited to use with the Bitcoin blockchain: alternative blockchain implementations and protocols, including non-commercial applications, also fall within the scope of the present invention. For example, techniques described within the present disclosure would provide advantages to utilising blockchain implementations that have limitations similar to Bitcoin regarding what constraints can be encoded within transactions, regardless whether an exchange of cryptocurrency occurs.

A blockchain is a peer-to-peer, electronic ledger that is implemented as a computer-based decentralised, distributed system made up of blocks, which, in turn, may be made up of transactions and other information. In some examples, a "blockchain transaction" refers to an input message encoding a structured collection of field values comprising data and a set of conditions, where fulfilment of the set of conditions is prerequisite for the set of fields to be written to a blockchain data structure. For example, with Bitcoin each transaction is a data structure that encodes the transfer of control of a digital asset between participants in the blockchain system, and includes at least one input and at least one output. In some embodiments, a "digital asset" refers to binary data that is associated with a right to use. Examples of digital assets include Bitcoin, ether, and Litecoin. In some implementations, transferring control of a digital asset can be performed by reassociating at least a portion of a digital asset from a first entity to a second entity. Each block contains a hash of the previous block so that blocks become chained together to create a permanent, immutable record of all transactions that have been written to the blockchain since its inception. Transactions contain small programs known as scripts embedded into their inputs and outputs that specify how and by whom the outputs of the transactions can be accessed. On the Bitcoin platform, these scripts are written using a stack-based scripting language.

In some examples, "stack-based scripting language" refers to a programming language that supports various stack-based or stack-oriented execution models and operations. That is, the stack-based scripting language may utilize a stack. With the stack, values can be pushed onto the top of the stack or popped from the top of the stack. Various operations performed to the stack can result in pushing or popping one or more of the values to or from the top of the stack. For example, an OP_EQUAL operation pops the top two items from the stack, compares them, and pushes a result (e.g., 1 if equal or 0 if unequal) to the top of the stack. Other operations performed to the stack, such as OP_PICK, may allow items to be selected from positions other than the top of the stack. In some scripting languages employed by some of the present embodiments, there may be at least two stacks: a main stack and an alternate stack. Some operations of the scripting language can move items from the top of one stack to the top of another stack. For example, OP_TOALT-STACK, moves a value from the top of the main stack to the top of the alternate stack. It should be noted that a stack-based scripting language, in some cases, may not be limited solely to operation in a strictly last-in-first-out (LIFO) manner. For example, a stack-based scripting language may support operations that copies or moves the n-th item in the stack to the top (e.g., OP_PICK and OP_ROLL respectively, in Bitcoin).

Scripts written in a stack-based scripting language may be pushed onto a logical stack that can be implemented using any suitable data structure such as a vector, list, or stack.

In order for a transaction to be written to the blockchain, it must be "validated". Network nodes (mining nodes) perform work to ensure that each transaction is valid, with invalid transactions rejected from the network. A node can have standards for validity different from other nodes. Because validity in the blockchain is consensus based, a transaction is considered valid if a majority of nodes agree that a transaction is valid. Software clients installed on the nodes perform this validation work on transactions referencing an unspent transaction (UTXO) in part by executing the UTXO locking and unlocking scripts. If execution of the locking and unlocking scripts evaluates to TRUE and other validation conditions, if applicable, are met, the transaction is validated by the node. The validated transaction is propagated to other network nodes, whereupon a mining node can select to include the transaction in a blockchain. Thus, in order for a transaction to be written to the blockchain, it must be i) validated by the first node that receives the transaction—if the transaction is validated, the node relays it to the other nodes in the network; and ii) added to a new block built by a mining node; and iii) mined, i.e., added to the public ledger of past transactions. The transaction is considered to be confirmed when a sufficient number of blocks is added to the blockchain to make the transaction practically irreversible.

Although blockchain technology is most widely known for the use of cryptocurrency implementation, digital entrepreneurs have begun exploring the use of both the cryptographic security system Bitcoin is based on and the data that can be stored on the blockchain to implement new systems. It would be highly advantageous if the blockchain could be used for automated tasks and processes which are not limited to the realm of cryptocurrency. Such solutions would be able to harness the benefits of the blockchain (e.g., a permanent, tamper proof records of events, distributed processing etc.) while being more versatile in their applications.

The present disclosure describes technical aspects of one or more blockchain-based computer programs. A blockchain-based computer program is a machine readable and executable program recorded in a blockchain transaction.

The blockchain-based computer program comprises rules that can process inputs in order to produce results, which can then cause actions to be performed dependent upon those results. One area of current research is the use of blockchain-based computer programs for the implementation of "smart contracts". Unlike a traditional contract which would be written in natural language, smart contracts may be computer programs designed to automate the execution of the terms of a machine-readable contract or agreement.

In embodiments, although interaction with specific entities can be encoded at specific steps in the smart contract, the smart contract can otherwise be automatically executed and self-enforced. It is machine readable and executable. In some examples, automatic execution refers to the execution of the smart contract that is successfully performed to enable transfer of the UTXO. Note that in such examples, "an entity." that is able to cause the transfer of the UTXO refers to an entity that is able to create the unlocking script without being required to prove knowledge of some secret. In other words, the unlocking transaction can be validated without verifying that the source of the data (e.g., entity that created the unlocking transaction) has access to a cryptographic secret (e.g., private asymmetric key, symmetric key, etc.). Also, in such examples, self-enforcement refers to the validation nodes of the blockchain network being caused to enforce the unlocking transaction according to the constraints. In some examples, "unlocking" a UTXO (also known as "spending" the UTXO) is used in the technical sense, referring to creating an unlocking transaction that references the UTXO and executes as valid.

A blockchain transaction output includes a locking script and information regarding ownership of digital assets such as Bitcoins. The locking script, which may also be referred to as an encumbrance, "locks" the digital assets by specifying conditions that are required to be met in order to transfer the UTXO. For example, a locking script could require that certain data be provided in an unlocking script to unlock the associated digital assets. The locking script is also known as "scriptPubKey" in Bitcoin. A technique for requiring a party to provide data to unlock a digital asset involves embedding a hash of the data inside the locking script. However, this presents a problem if the data is undetermined (e.g., not known and fixed) at the time the locking script is created.

The invention may be described as a verification method/ system, and/or as a control method/system for controlling the validation of blockchain transactions. In some embodiments, a validated blockchain transactions results in recordation of the transaction on a blockchain, which in some applications, may result in an exchange or transfer of a digital asset via the blockchain. The digital asset may be a unit of a resource managed by a blockchain. Although the digital asset may, in some embodiments, be used as cryptocurrency, it is contemplated that the digital asset, in embodiments, is additionally or alternatively usable in other contexts. Note that the invention, while applicable to the control of digital assets, is technical in nature and can be used in other contexts that utilise blockchain data structures without necessarily involving the transfer of digital assets.

SUMMARY OF INVENTION

Thus, it is desirable to provide methods and systems that improve blockchain technology in one or more of these aspects. Such an improved solution has now been devised. Thus, in accordance with the present invention there is provided a method as defined in the appended claims.

Thus, it is desirable to provide a computer-implemented method, the computer-implemented method comprising:

determining a smart contract between counterparties, the set of conditions having a plurality of possible outcomes that includes:

a first possible outcome associated with a first distribution of a digital asset; and a second possible outcome associated with a second distribution, different from the first distribution, of the digital asset:

creating a counterparty transaction that includes, as output, the set of conditions encoded into computer-executable instructions and the digital asset;

receiving an outcome from a third party, the outcome corresponding to the first possible outcome or the second possible outcome;

creating an outcome transaction to transfer control of the digital asset of the counterparty transaction, the outcome transaction including the outcome as input; and as a result of validating the outcome transaction at a node in a blockchain network distributing, based at least in part on the outcome, the digital asset to the counterparties in accordance with the first possible outcome or the second possible outcome.

The third party may be a group comprising a plurality of members.

The outcome may be a result of a consensus of answers submitted by the plurality of members.

An amount of members to comprise the plurality of members may be determined. Additionally or alternatively, a threshold number to determine the outcome may be determined. The outcome may match answers submitted by at least the threshold number of the plurality of members.

The outcome may be determined based at least in part on key shares submitted by the plurality of members. Additionally or alternatively, the key shares may be determined according to a secret sharing scheme.

The key shares may be committed by the plurality of members to a block in a proof-of-stake blockchain.

At least one coordination algorithm transaction associated with a second digital asset may be created. Additionally or alternatively, as a result of validating a distribution transaction created to transfer control of the second digital asset, the second digital asset may be distributed to the third party.

The second digital asset may comprise a deposit portion contributed by the third party.

The second digital asset may additionally or alternatively comprise a distribution portion contributed by the counterparties.

The plurality of members may include a member whose answer is a mismatch to the consensus. Additionally or alternatively, as a result of the answer being a mismatch to the consensus of answers, distributing of the second digital asset may exclude the member from receiving the distribution portion.

The digital asset may comprise a first amount of the digital asset contributed by a first party and a second amount of the digital asset contributed by a second party.

One of the plurality of possible outcomes may be associated with a timeout condition for the set of conditions. Additionally or alternatively, further as a result of validating the outcome transaction and as a result of an occurrence of the timeout condition, the first amount may be refunded to the first party. Additionally or alternatively, further as a result of validating the outcome transaction and as a result of an occurrence of the timeout condition, the second amount may be refunded to the second party.

A plurality of private outcome keys corresponding to the plurality of possible outcomes may be received from the third party. Additionally or alternatively, the outcome may a cryptographic key that corresponds to one of the plurality of private outcome keys. A secret value determined by the counterparties may be combined with each of the plurality of private outcome keys to produce a plurality of obfuscated outcome keys. The counterparty transaction may be created to further include the plurality of obfuscated private keys. Validating the outcome transaction may include combining the cryptographic key with the secret value to produce an outcome signing key. Additionally or alternatively, validating the outcome transaction may include distributing the digital asset to the counterparties based at least in part on which of the plurality of obfuscated private keys is associated with the outcome signing key.

Thus, it is further desirable to provide a computer-implemented method, the computer-implemented method comprising:

communicating, to a set of counterparties, assent to determine an outcome of a set of conditions, the set of conditions having a first possible outcome and a second possible outcome;

generating, using a secret sharing protocol, a first private key share corresponding to the first possible outcome and a second private key share corresponding to the second possible outcome;

transferring an amount of a digital asset to an address associated with a first blockchain transaction;

as a result of determining the outcome to be the first possible outcome, revealing the first private key share within a particular time frame, the first private key share usable, at least in part, by the set of counterparties to determine the outcome;

generating, based at least in part on the first private key share, a signature usable at least in part to validate a second blockchain transaction for spending the amount of the digital asset associated with the first blockchain transaction; and causing the second blockchain transaction to be validated at a node in a blockchain network to obtain control of the amount of the digital asset.

It is also desirable to provide a computer-implemented method, the computer-implemented method comprising:

communicating, to a set of counterparties, assent to determine an outcome of a set of conditions, the set of conditions having a first possible outcome and a second possible outcome;

generating, using a secret sharing protocol, a first private key share corresponding to the first possible outcome and a second private key share corresponding to the second possible outcome;

transferring an amount of a digital asset to an address associated with a first blockchain transaction;

as a result of determining the outcome to be the first possible outcome, revealing the first private key share within a particular time frame, the first private key share usable, at least in part, by the set of counterparties to determine the outcome;

generating, based at least in part on the first private key share, a signature usable at least in part to validate a second blockchain transaction for unlocking the amount of the digital asset associated with the first blockchain transaction; and causing the second blockchain transaction to be validated at a node in a blockchain network.

A first public key associated with the first possible outcome and a second public key associated with the second possible outcome may be generated. Additionally or alternatively, the first public key and the second public key may be provided to the set of counterparties. Additionally or alternatively, the first private key share may be usable to determine the outcome by generating, at least in part using the first private key share, a first private key. Additionally or alternatively, the first private key share may be usable to determine the outcome by determining that the first private key is associated with the first public key.

The secret sharing protocol may a dealer-free secret sharing protocol.

Revealing the first private key share may include revealing the first private key share in a third blockchain transaction.

The third blockchain transaction may be a transaction in a proof-of-stake blockchain.

The particular time frame may a second time frame. Additionally or alternatively, revealing the first private key share may further include committing a cryptographic hash of the first private key share in a commit transaction within a first time frame, previous to the second time frame. Additionally or alternatively, validating the third blockchain transaction may include determining that the first private key share in the third blockchain transaction corresponds to the cryptographic hash in the commit transaction.

The first blockchain transaction may further include a second amount of a second digital asset transferred from a subset of the set of counterparties. Additionally or alternatively, control of the second amount of the second digital asset may be transferred further as a result of causing the second blockchain transaction to be validated.

The first blockchain transaction may further include a timeout condition. Additionally or alternatively, as a result of fulfilment of the timeout condition, causing the second blockchain transaction to be validated may transfer control of the second amount of the second digital asset to the subset of the set of counterparties.

Validation of the second blockchain transaction may include validating a digital signature generated using a group cryptographic key, the group cryptographic key associated with a group of participants that have assented to determine the outcome.

The group of participants may include a first subset of participants that reveal key shares corresponding to the first possible outcome. Additionally or alternatively, the group of participants may include a second subset of participants that reveal key shares corresponding to the second possible outcome. Additionally or alternatively, transferring control of the second amount may include transferring control of the second amount to the first subset of participants, excluding the second subset of participants.

A group public key associated with the group of participants may be generated. Additionally or alternatively, the group public key may be provided to the set of counterparties. Additionally or alternatively, the first blockchain transaction may be created, at least in part, using the group public key. Additionally or alternatively, the validation of the second blockchain transaction may include determining that the group cryptographic key is associated with the group public key of the first blockchain transaction.

A group private key share may be generated using the secret sharing protocol. Additionally or alternatively, further as a result of determining the outcome, the group cryptographic key may be generated based at least in part on the group private key share.

The first private key share may belong to a plurality of first private key shares distributed among the group of participants. Additionally or alternatively, the first private key shares may correspond to the first possible outcome. Additionally or alternatively, determining the outcome to be the first possible outcome may include determining that a threshold number of the plurality of first private key shares have been revealed by the group of participants.

It is also desirable to provide a system, comprising: a processor; and memory including executable instructions that, as a result of execution by the processor, causes the system to perform any of the methods as claimed.

It is also desirable to provide a non-transitory computer-readable storage medium having stored thereon executable instructions that, as a result of execution by one or more processors of a computer system, cause the computer system to at least perform any of the methods as claimed.

The invention can be described as a verification method/system, and/or as a control method/system for controlling the exchange or transfer of a digital asset via a blockchain. In some embodiments, the digital asset is a token or a portion of cryptocurrency. As explained below, the invention can also be described as a secure method/system for new, improved and advantageous ways of performing operations via a blockchain network or platform.

BRIEF DESCRIPTION OF THE DRAWINGS

These and other aspects of the present invention will be apparent from and elucidated with reference to, the embodiment described herein. An embodiment of the present invention will now be described, by way of example only and with reference to the accompanying drawings, in which.

DETAILED DESCRIPTION

Figure 1:
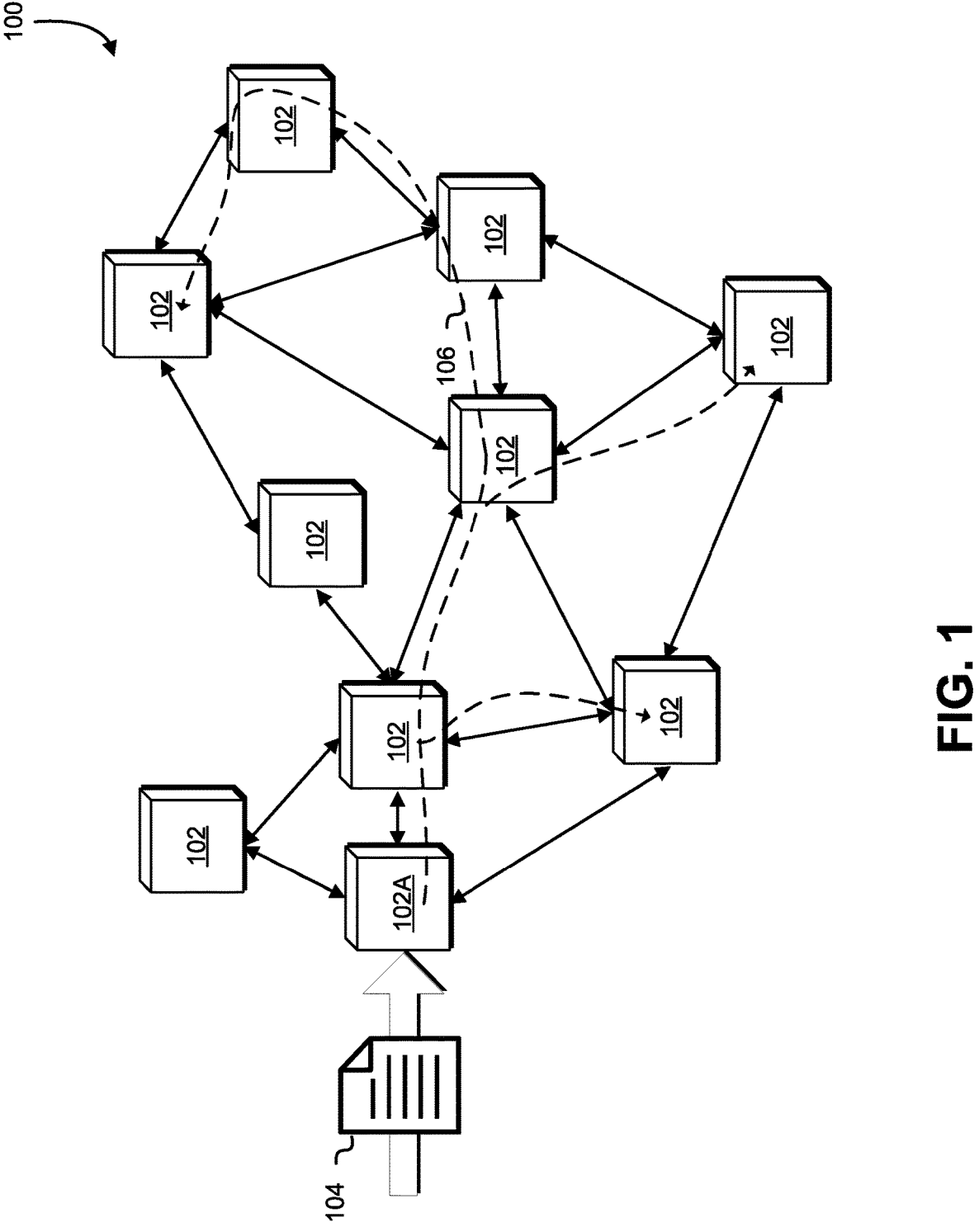
FIG. 1 illustrates a blockchain environment in which various embodiments can be implemented.

Reference will first be made to FIG. 1, which illustrates an example blockchain network 100 associated with a blockchain in accordance with an embodiment of the present disclosure. In the embodiment, the example blockchain network 100 comprises blockchain nodes that are implemented as peer-to-peer distributed electronic devices, each running an instance of software and/or hardware that performs operations that follow a blockchain protocol that is, at least in part, agreed to among operators of nodes 102. In some examples, "nodes" refers to peer-to-peer electronic devices that are distributed among the blockchain network. An example of a blockchain protocol is the Bitcoin protocol.

Figure 8:
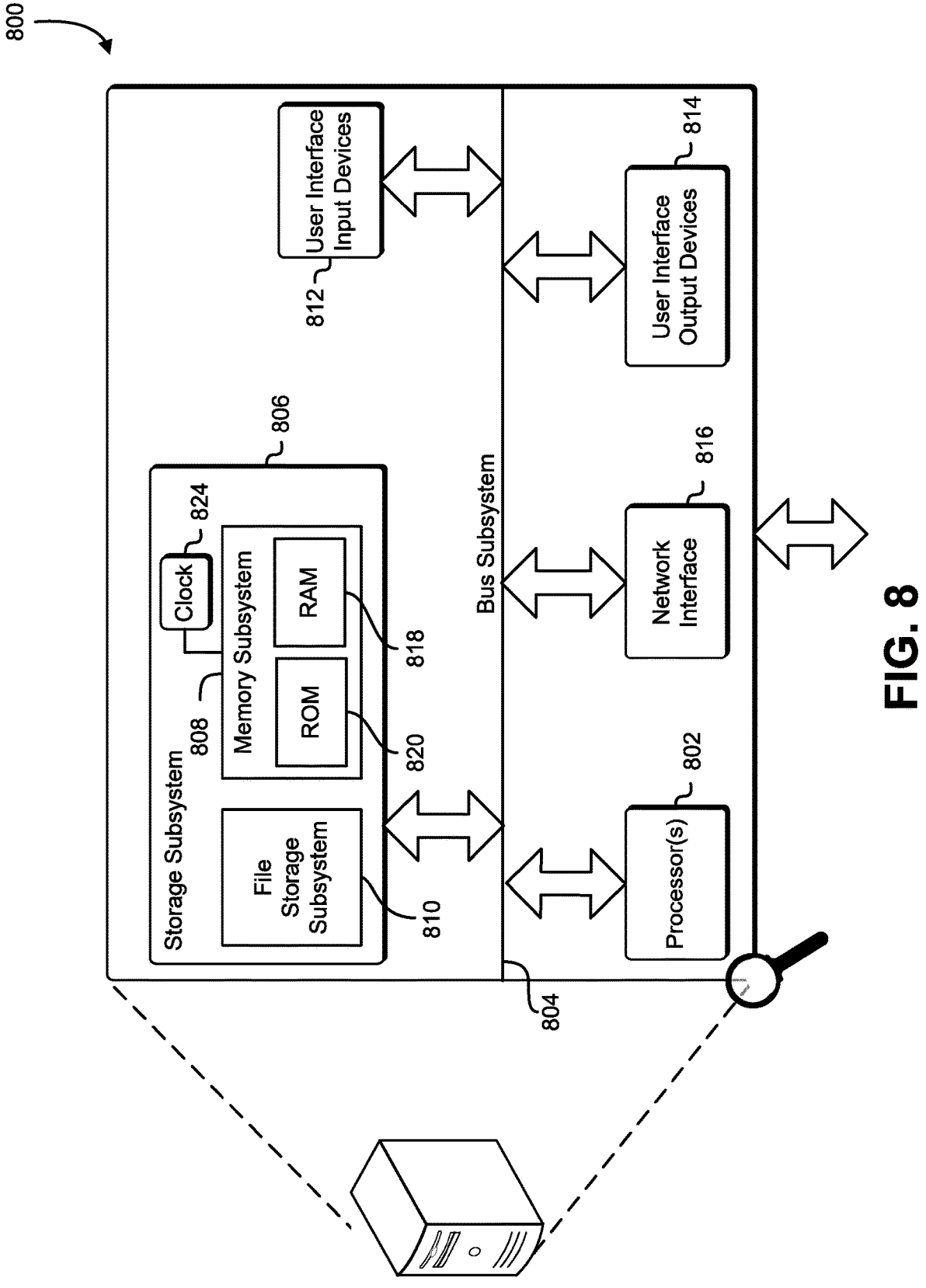
FIG. 8 illustrates a computing environment in which various embodiments can be implemented.

In some embodiments, the nodes 102 can be comprised of any suitable computing device (e.g., by a server in a data centre, by a client computing device (e.g., a desktop computer, laptop computer, tablet computer, smartphone, etc.), by multiple computing devices in a distributed system of a computing resource service provider, or by any suitable electronic client device such as the computing device 800 of FIG. 8). In some embodiments, the nodes 102 have inputs to receive data messages or objects representative of proposed transactions, such as a transaction 104. The nodes, in some embodiments, are be queryable for information they maintain, such as for information of a state of the transaction 104.

As shown in FIG. 1, some of the nodes 102 are communicatively coupled to one or more other of the nodes 102. Such communicative coupling can include one or more of wired or wireless communication. In the embodiment, the nodes 102 each maintain at least a portion of a "ledger" of all transactions in the blockchain. In this manner, the ledger would be a distributed ledger. A transaction processed by a node that affects the ledger is verifiable by one or more of the other nodes such that the integrity of the ledger is maintained.

As for which nodes 102 can communicate with which other nodes, it can be sufficient that each of the nodes in the example blockchain network 100 are able to communicate with one or more other of the nodes 102 such that a message that is passed between nodes can propagate throughout the example blockchain network 100 (or some significant portion of it), assuming that the message is one that the blockchain protocol indicates should be forwarded. One such message might be the publication of a proposed transaction by one of the nodes 102, such as node 102A, which would then propagate along a path such as a path 106. Another such message might be the publication of a new block proposed for inclusion onto a blockchain.

In an embodiment, at least some of the nodes 102 are mining nodes that perform complex calculations, such as solving cryptographic problems. A mining node that solves the cryptographic problem creates a new block for the blockchain and broadcasts the new block to others of the nodes 102. The others of the nodes 102 verify the work of the mining node and, upon verification, accept the block into the blockchain (e.g., by adding it to the distributed ledger of the blockchain). In some examples, a block is a group of transactions, often marked with a timestamp and a "fingerprint" (e.g., a hash) of the previous block. In this manner, each block may become linked to a previous block, thereby creating the "chain" that links the blocks in the blockchain. In embodiments, valid blocks are added to the blockchain by a consensus of the nodes 102. Also in some examples, a blockchain comprises a list of validated blocks.

In an embodiment, at least some of the nodes 102 operate as validating nodes that validate transactions as described in the present disclosure. In some examples, a transaction includes data that provides proof of ownership of a digital asset (e.g., a number of Bitcoins) and conditions for accepting or transferring ownership/control of the digital asset. In some examples, an "unlocking transaction" refers to a blockchain transaction that reassociates (e.g., transferring ownership or control) at least a portion of a digital asset, indicated by an unspent UTXO of a previous transaction, to an entity associated with a blockchain address. In some examples, a "previous transaction" refers to a blockchain transaction that contains the UTXO being referenced by the unlocking transaction. In some embodiments, the transaction includes a "locking script" that encumbers the transaction with conditions that must be fulfilled before ownership/control can be transferred ("unlocked").

In some embodiments, the blockchain address is a string of alphanumeric characters that is associated with an entity to which control of at least a portion of a digital asset is being transferred/reassociated. In some blockchain protocols implemented in some embodiments, there is a one-to-one correspondence between a public key associated with the entity and the blockchain address. In some embodiments, validation of transactions involves validating one or more conditions specified in a locking script and/or unlocking script. Upon successful validation of the transaction 104, the validation node adds the transaction 104 to the blockchain and distributes it to the nodes 102.

Examples of the operation codes referred to in the present disclosure include:

OP_CHECKSIG, in which a public key and signature are popped from the stack and verified against a signature of the transaction fields according to the SIGHASH type. If the signature is valid, 1 is returned, 0 otherwise.

OP_DUP, which duplicates the top stack item.

OP_ELSE, which, if the preceding OP_IF or OP_NOTIF or OP_ELSE was not executed, then these statements are executed; otherwise, if the preceding OP_IF or OP_NOTIF or OP_ELSE was executed, then these statements are not executed OP_ENDIF, which ends an if/else block.

OP_IF, which, if the top stack value is not False, the statements are executed and the top stack value is removed OP_CHECKMULTISIG, which compares the first signature with each public key until it finds a match. Then with the subsequent public key, it compares the second signature against each remaining public key until it finds a match. This process is repeated until all signatures have been checked. If the signatures are valid, then 1 is returned, 0 otherwise.

Figure 2:
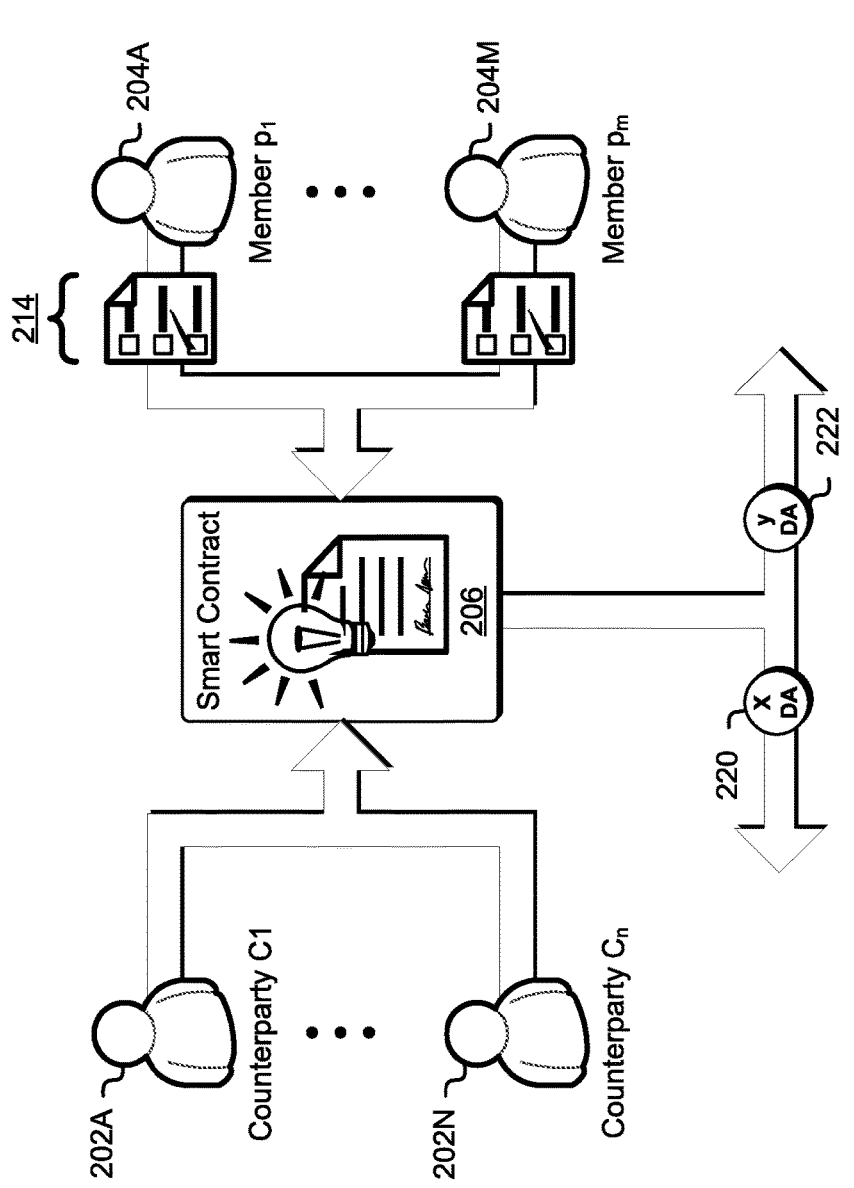
FIG. 2 illustrates an example of a smart contract in accordance with an embodiment.

OP_CHECKLOCKTIMEVERIFY, which exits with error if the top stack item is greater than the transaction nLockTime; otherwise, the script evaluation continues FIG. 2 illustrates an example embodiment 200 of the present disclosure. As illustrated in FIG. 2, the example embodiment 200 may include counterparties 202A-202N ($C_1$-$C_n$) who create a smart contract 206 that distributes an amount of a digital asset 220 that is dependent upon a consensus of answers 214 received from a group of members 204A-204M ($p_1$-$p_m$) recruited to objectively determine the answers 214 in exchange for a distribution 222. That is, in embodiments, the members 204A-204M collectively act as a distributed trusted oracle to provide the answer to a decision problem or a function problem. In some examples, an "oracle" refers to an external agent that provides input that can determine an outcome: oracle-related services include Oraclize, Town Crier, and the Orisi service. In some embodiments, the members 204A-204M may have no knowledge of the identities of other members of the group or have knowledge of the answers provided by the other members of the group. By keeping the members anonymous from each other, the potential for collusion between members is minimised.

In some embodiments, the counterparties 202A-202N may be two or more entities that have agreed upon the terms of a smart contract. In various embodiments, one of the counterparties 202 is an individual, a group of individuals, a corporation, a computing device, or some other entity capable of determining or agreeing to terms of the smart contract 206. In one use case, a first counterparty is a client and a second counterparty is an insurer. In some embodiments, at least one of the counterparties 202A-202N offers the distribution 222 as a distribution to interest other entities into participating as the members 204A-204M that determine the outcome of the smart contract 206. In some embodiments, at least one of the counterparties 202A-202N determines how many members are to comprise the group of members 204A-204B. In various embodiments, the number is an exact number, a minimum number, or a maximum number of members. The more members in the group, the more reliable the consensus answer provided by the group should be.

In some embodiments, the members 204A-204M are a group of entities capable of determining an outcome of a condition of the smart contract 206. As with the counterparties 202A-202N, in various embodiments, one of the members is an individual, group of individuals, a corporation, a software application, a computing device, or some other entity capable of providing an answer usable to determine an outcome of the smart contract 206. As noted above, in some embodiments, the number of the members 204A-204M may be specified by the counterparties 202A-202N. In one example, the counterparties 202A-202N specify that there must be 15 members in the group.

In an embodiment, the counterparties 202A-202N generate the smart contract 206 to refund any amounts of digital asset (minus transaction distributions) deposited by the counterparties 202A-202N if not enough members join the group (e.g., within a specified amount of time). As noted above, in some embodiments, the members 204A-204M may be provided with a reason to participate in determining the answers 214 by the distribution 222 put up by the counterparties 202A-202N. In some embodiments, the members 204A-204M submit answers that match a consensus of the answers receive the distribution 222 or some proportion (e.g., divided by a number of members) of the distribution 222. In some of these embodiments, members that submit non-consensus answers (answers that do not agree with the consensus answers) forfeit their distribution 222 or proportion of the distribution 222. In other embodiments, the members that submit non-consensus answers receive a lesser distribution or smaller proportion of the distribution 222 than received by the members that submit answers that match the consensus.

In various examples, consensus refers to a simple majority of matching answers, an absolute majority of matching answers, a majority of matching answers submitted before reaching a threshold (e.g., the first three matching answers are considered consensus answers), or a threshold number of matching answers. In some embodiments, the counterparties 202A-202N determine the threshold for determining the consensus. In an example, the counterparties 202A-202N determine that at least 60% of the members 204A-204M must submit matching answers for consensus to be reached.

In addition, in some embodiments, each of the members commits a deposit (e.g., of some amount of a digital asset), which provides further reason for the members 204A-204M to submit answers. That is, in these embodiments, a member who agrees to participate but reneges on the agreement loses the deposit that the member committed. In some embodiments, even if the member submits a non-consensus answer, the member is still refunded the deposit such that the member at least loses no digital assets by participating. In determining the amount of the deposit to require, the counterparties 202A-202N may balance making the deposit large enough that the members 204A-204M are provided with a reason to provide prompt and accurate answers in order to have their deposits returned while not so large as to discourage the members 204A-204M from wanting to participate at all.

In some embodiments, the smart contract 206 is a set of computer-executable instructions (e.g., operation codes) designed to automatically transfer control of a digital asset in accordance with conditions agreed upon by the counterparties 202A-202N. In some embodiments, the smart contract 206 is coded within a blockchain transaction (e.g., as computer-executable instructions written in a scripting language), and activated by validation of the blockchain transaction by a validation node of a blockchain network. In embodiments, a digital asset associated with the blockchain transaction is redeemable (e.g., obtainable) by fulfilment of a condition specified in the smart contract 206. In embodiments, the smart contract 206 is included in a locking script of a validated transaction in the distributed ledger of the blockchain network. In this manner, the executable instructions are rendered immutable, and successful execution of the locking script containing the smart contract 206 is a precondition for transferring a digital asset of the validated transaction.

Moreover, as noted above, in embodiments, the smart contract 206 includes a set of conditions, and unlocking the UTXO of the validated transaction depends on fulfilment of the set of conditions. In an example, the smart contract 206 is an insurance contract that distributes a digital asset to an insuree in accordance with the insurance contract upon providing, as input to a locking script of the blockchain transaction, proof that the insuree has suffered a loss covered by the insurance contract. Furthermore, in some embodiments, the smart contract 206 is associated with a plurality of possible outcomes, and the result of successful execution of the validation containing the smart contract 206 may differ depending on the particular outcome. In the above example, the smart contract 206 has at least two possible outcomes: a first possible outcome a second possible outcome. The first possible outcome is that the insuree suffers a covered loss and receives a pay out in accordance with the insurance contract. The second possible outcome is that the insuree does not suffer a loss and the insurer retains the digital asset and the insuree's premium payment. In embodiments, execution of the computer-executable instructions in the smart contract 206 will cause the smart contract 206 to transfer the digital asset in accordance with one of the possible outcomes if data that proves the particular outcome is provided as input to the locking script.

In some embodiments, the answers 214 are answers that correspond to one or more of the outcome conditions specified in the smart contract 206. As an example, the smart contract could include a plurality of conditions that affect an amount of the digital asset 220 paid out and to which entity the digital asset 220 is paid to. The members 204A-204M submit the answers 214, which are usable to determine which (if any) of the plurality of conditions are fulfilled. In some embodiments, the answers 214 are submitted in the form of a cryptographic key or a digital signature. In this manner, the condition that is fulfilled is determinable by determining which condition in the smart contract 206 corresponds to the cryptographic key or digital signature submitted by a consensus of the members 204A-204M.

In some embodiments, the digital asset 220 is an amount of digital asset paid out in accordance with the particular condition of the smart contract 206 that is fulfilled. That is, depending on which particular condition is fulfilled, the amount of the digital asset could vary. For example, if a first condition is the fulfilled condition, 10 units of the digital asset may be paid to a particular entity, whereas if a second condition is the fulfilled condition, 2 units of the digital asset may be paid to the same or different entity.

As noted above, in some embodiments, the distribution 222 is an amount of a digital asset offered as a distribution by one or more of the counterparties 202A-202N to the members 204A-204M for agreeing to participate in providing the answers 214. In some embodiments, the distribution 222 is provided by a third party.

In the present disclosure, it is assumed that all participants can authenticate each other and communicate with each other via secure communication channels. In an embodiment, secure communication can be achieved using a public key cryptosystem or a Diffie-Hellman key exchange protocol. In an embodiment, each participant in the scheme is required to generate secret values (private keys) derived from cryptographically secure pseudorandom number generators (CSPRNG) with at least a certain level of entropy. In an embodiment, to maintain compatibility with the Bitcoin protocol these values are 256-bit numbers.

In an embodiment, certain functionality is facilitated through the use of elliptic curve operations. In an embodiment, elliptic curve (EC) operations are performed using parameters defined by the Secp256k1 curve, currently used in the Bitcoin protocol to perform public key generation, signature generation, and signature verification. In addition to the curve parameters, the Secp256k1 standard specifies the generator point G and its order p. Unless otherwise specified, in embodiments, operations in the algorithm described in the present disclosure are performed over modulo p. Note also that, although certain embodiments of the present disclosure are presented in relation to the Bitcoin blockchain, it is contemplated that the concepts are also applicable to any cryptocurrency blockchain that employs an Elliptic curve signature scheme.

In an embodiment, two separate groups of participants are involved, counterparties ($C_i$) to the main contract and members ($P_i$) contributing to a coordination algorithm, such as a Schelling coordination game. For example, a Schelling coordination game is a coordination game where two or more individuals tend to arrive at the same solution (also referred to as a "focal point" or "Schelling point") without communicating with each other. In this manner, the members function as a distributed group oracle that provides accurate input to determine the outcome of the main contact. In embodiments, the counterparties 202A-202N have funds under the control of the contract and collectively provide the distribution 222 to the members in a separate blockchain transaction. Note, however, that because the coordination algorithm provides a distribution to members for submitting the same answers as are submitted by a threshold number of members, the answers are not necessarily correct but may reflect the answers that individual members think other members will submit.

Also in embodiments, the members commit security deposits in a separate blockchain transaction, which can be refunded after the members submit their answers, and can potentially win the distribution or a portion of the distribution if their answer matches the consensus answer. If their answer is not the consensus answer, the members may receive their deposit back but may not receive the distribution 222 or the portion of the distribution 222, or may receive a smaller portion than received by members who submitted the consensus answer.

Contract Set-Up

In an embodiment, the main contract (also referred to as the "counterparty contract") can be implemented as a linked coordination algorithm (such as a Schelling coordination game) in the following manner: A number n of counterparties 202A-202N ($C_1$, $C_2$ . . . , $C_n$) agree to the terms and conditions of the contract, including the funds involved. Note that at this stage, agreement may be informal, and funds need not be committed until transactions are signed. The general structure of the contract at this stage is shown below in table 1.

TABLE 1

| Condition | Result |
|---|---|
| Condition 1 | $C_1 \rightarrow X_1^1$ DA |
| | . |
| | . |
| | . |
| | $C_n \rightarrow X_n^1$ DA |
| . | . |
| . | . |
| . | . |
| Condition m | $C_1 \rightarrow X_1^m$ DA |
| | . |
| | . |
| | . |
| | $C_n \rightarrow X_n^m$ DA |
| Timeout Condition | $C_1 \rightarrow X_1^T$ DA |
| | . |
| | . |
| | . |
| | $C_n \rightarrow X_n^T$ DA |

In an embodiment, upon fulfilment of a first condition, the counterparties 202A-202N receive an amount X of a digital asset (DA) as specified in the result. Note that, in an embodiment, the conditions (outcomes) must be specified unambiguously and must be mutually exclusive. Further, in an embodiment, the sum of the amounts $X_j^i$ (j=1, . . . , n) for each condition i is also equal to the funds to be paid into the contract (minus any transaction mining amount). In addition, in some embodiments, a timeout condition is added to specify what should happen to the funds if the protocol fails after a timeout period. In an embodiment, each counterparty Cj has a public key PKCj.

Figure 3:
FIG. 3 illustrates an example of setting up a smart contract in accordance with an embodiment.

FIG. 3 illustrates an example embodiment 300 of the present disclosure. Specifically, FIG. 3 depicts a high-level schematic of a public key set-up process for the example embodiment 300 of the present disclosure. The example embodiment 300 includes counterparties 302 that have agreed upon a contract 306 and have placed a request 308 for a number of members 304 to provide outcomes to the conditions in the contract. As can be seen, the request 308 can include such relevant information as definitions of the contract conditions (Def), an offered distribution (F), number of members required (N), an amount of a security deposit (D) required per member, the required threshold (M), a ghost chain block interval ($\Delta T$) and commitment block height (hp). Identities of the counterparties and the distributions of digital asset controlled by the smart contract transaction 330 may be absent/withheld from the request 308 so as to not influence group member votes.

In the example embodiment 300, the counterparties also generate a contract public key 316. In embodiments, the counterparties 302 are able to communicate with each other (e.g., via email and/or other electronic communication) and at least one of the counterparties 302 is able to communicate to the members 304, such as through a portal, online marketplace, weblog, peer-to-peer communication, or some other communication forum. In an embodiment, at a time after enough (at least equal to the number specified by the counterparties 302 in the request 308) members signal agreement to be a part of the group, the members 304 agree to generate a group public key 312 and shared public keys 314 that correspond to each contract condition/outcome. In the example embodiment, 300, the members 304 utilize a dealer-free secret sharing scheme to generate the group public key 312 and the shared public keys 314. In the example embodiment 300, the value of the contract public key 316 provided by the counterparties 302 is combined with the separate public keys 314 to produce the contract condition public keys 318.

In the example embodiment 300, the counterparty transaction 330 distributes to one or more of the counterparties 302 according to the outcome determined based on an appropriate digital signature corresponding to one of the contract condition public keys 318. Likewise, in the example embodiment 300, the coordination algorithm transaction 332 transfers distributions and deposits to the members 304 upon determination (via the coordination algorithm) of the winning outcome.

The following is an example use case of the contract set-up above. In the example use case, an insurance contract is created between two counterparties 302, client ($C_1$) and insurer ($C_2$). The client, in this example, wishes to insure against the possibility of a hard frost at his vineyard at any time during April 2018. In the example, the hard frost is unambiguously defined as "any continuous period of at least 4 hours in the month of April 2018 where the air temperature remains below $-4°$ C. in the county of Surrey". In the example, the insurer agrees to a policy that will pay out 10 DA in the event of a hard frost in exchange for a premium of 2 DA from the client. Thus, the insurer commits 10 DA to the contract and the client commits 2 DA to the contract. Consequently, the contract would be as shown below in table 2, controlling a total of 12 DA (the insurer deposit and the premium).

TABLE 2

| Condition | Result |
|---|---|
| Hard frost | $C_1 \rightarrow 10$ DA |
| | $C_2 \rightarrow 2$ DA |
| No hard frost | $C_1 \rightarrow 0$ DA |
| | $C_2 \rightarrow 12$ DA |
| If time > June 2018 | $C_1 \rightarrow 2$ DA |
| | $C_2$ 10 DA |

Thus, on a condition that a hard frost occurs, the client receives 10 DA and the insurer receives 2 DA. On the other hand, on a condition that no hard frost occurs, the client receives no funds while the insurer recoups the original 10 DA plus the 2 DA premium for a total of 12 DA. In the event that neither condition is unambiguously verified and the timeout condition occurs, the client is refunded the 2 DA premium and the insurer likewise is refunded the 10 DA pay out. Note that the timeout condition should be redundant if there is no ambiguity about the event; the timeout exists to prevent funds being lost if the protocol fails to provide a decision, and in this example just issues a refund to each party. Note also that, in embodiments, counterparties also agree on a distribution for the execution of the contract, and who will pay this distribution: the amount chosen for the distribution could depend on the security required and nature of the conditions.

In embodiments, one of the counterparties (or a third party/service acting on their behalf) posts a request to an open marketplace (or public forum) specifying definitions of the contract conditions (Def), an offered distribution (F), number of members required (N), an amount of a security deposit (D) required per member, the required threshold (M), a ghost chain block interval ($\Delta$T) and commitment block height ($h_B$). In embodiments, the ghost chain block interval refers to the frequency in which blocks are committed to the ghost chain blockchain. Also in embodiments, the commitment block height refers to the number of blocks in the ghost chain.

Thus, in the example use case above, the insurer offers a distribution of 0.2 DA and requires a group of 10 members to submit one of two outcomes:

1. Outcome #1: "In the month of April 2018, the air temperature remains below-4° C. continuously for at least 4 hours anywhere in the county of Surrey, UK".
2. Outcome 2: "[Some other outcome exclusive of condition 1]"

In the example use case, the insurer and client agree upon a threshold of 6. That is, agreement by at least 6 of the 10 members will dictate which of the above conditions is fulfilled. In the example, the members are required to submit a deposit of 0.1 DA each. As a result, available members can view the outcome definitions and decide if they wish to participate based on their ability to evaluate the conditions (e.g., either they have direct or indirect [i.e. via news/internet] access to the required information), the potential winnings (F) and the required deposit. The members communicate their acceptance to the counterparties and include an authenticated UTXO containing the deposit, and a public address for communications.

When a sufficient number (N) of members ($P_i$) have signalled their acceptance of the request, in an embodiment, the counterparties distribute their communication addresses to the group of members. In embodiments, the members and counterparties can then establish secure peer-to-peer communication channels with each other. In embodiments, the member group executes a dealer-free secret sharing protocol with threshold M to generate a group public key (GPK) and a separate public key (and associated individual key shares) for each of the contract conditions/outcomes ($IPK^i$), and these public keys are sent to the counterparties.

In embodiments, the members use a method of sharing a secret key such that each member has a share of a (as yet unknown) secret key. The secret key itself can be calculated from a threshold number of share (where the threshold is less than or equal to the number of members). Thus, although the secret key is unknown to any single party, the group of members can determine an elliptic public key that corresponds to the as yet unknown secret key via secure multi-party computation. In this manner, a blockchain output can be put under the control of a shared group key in a trustless way, and the private key can be determined (or a signature generated) through collaboration of a threshold number of members.

In some embodiments, a Shamir's Secret Sharing scheme (SSSS) is used for this purpose. The SSSS is based on a concept that a polynomial of degree t can be fit to any set of t+1 (threshold) points. A polynomial f(x) of degree t is formed with the shared private key as the constant term ($\alpha_0$=f(0)) and the remaining coefficients are picked at random. A number of points on the curve equal to the number of members in the group are given to each member. If the number of members who combine their points are equal to or greater than (t+1), there is sufficient information to fit the order t polynomial to these points, and $\alpha_0$ is revealed as the secret. In embodiments, this scheme enables the sharing of a single private key among an arbitrarily large number of members with any threshold.

The standard SSSS can be extended to remove the requirement of a trusted dealer to create the polynomial and distribute the secret shares, which removes reliance on a trusted dealer. In this dealer-free SSSS, each member ($P_i$) generates their own random degree t polynomial $f_i(x)$, and then securely sends $f_i(j)$ to each other participant $P_j$. Each $P_i$ then sums all the received points to obtain their secret share $s_i$=f(i), which is the $P_i$ point on the shared polynomial f(x).

After the secret shares have been created, the public key (A) corresponding to the shared private key (which no member yet knows) is computed as follows with elliptic curve generator G. Participants $P_i$, where i=1, . . . , t+1, compute their public key share as $b_i s_i \times G$, where $$b_i = \prod_{j \in U, j \neq i} \frac{i}{j - i}$$

These public key shares are then broadcast to all members and the shared public key A is then calculated simply as the sum of t+1 shares:

$$A = \sum_{i=1}^{t+1} b_i s_i \times G$$

Note that arithmetic properties of elliptic curve cryptography (ECC) are utilised in the present disclosure. ECC operations can be defined with a generator point G of order p. Once a random private key (a) has been chosen (between 1 and p), the public key (A) can be derived by point multiplication:

$$A = a \times G$$

Furthermore, due to the fundamental properties of the point multiplication:

$$(a+r) \times G = a \times G + r \times G$$

Where r can be a nonce. In embodiments, this property can be used to employ random blinding nonces to elliptical curve signatures. Also in the present disclosure, an elliptic curve digital signature algorithm scheme is used in various embodiments to enable a group to collectively sign a transaction using a threshold of key share without reconstructing the full private key.

To continue further with the example use case described above, the group of 10 members collectively execute the dealer-free SSSS protocol three times (with a threshold of 6, as agreed above). The group of 10 members generate a group public key (GPK) and two outcome public keys ($IPK^1$ and $IPK^2$). As a result, each member j then possesses 3 secret key shares ($GPriv_j$, $IPriv_j^1$, and $IPriv_j^2$). The group public key further enables the members 304 to determine a blockchain address to which to send their deposit.

In an embodiment, the counterparties 302 then agree on a random blinding nonce ($R_B$). In the embodiment, the value chosen is stored by all counterparties but kept secret from the member group. In an embodiment, the counterparties then calculate the corresponding elliptic curve public key for $R_B$:

$$PKR = R_B \times G$$

The value of PKR is then added to each of the contract condition public keys:

$$IPK_R^i = IPK^i + PKR$$

Thus, in the example, the counterparties 302 calculate the contract condition public keys 318, $IPK_R^1 = IPK^1 + PKR$ and $IPK_R^2 = IPK^2 + PKR$, and so on. In this manner, the public keys 314 are obfuscated due to the use of the random blinding nonce ($R_B$) such that entities other than the counterparties 302, such as the members 304, will be extremely unlikely to be able to link any of the contract condition public keys 318 used in the counterparty transaction 330 to the separate public keys 314 the members 304 produced. In this manner, the counterparty transaction 330 (and the amounts it contains) remains anonymous and the decisions made by the members 304 are isolated from being influenced by knowledge of details of the contract transaction (e.g., an amount of digital asset at stake, etc.).

In the example, two transactions are created by agreement of the counterparties 302: the counterparty transaction 330 (TxC) and the coordination algorithm transaction 332 (TxS). In an embodiment, the counterparty transaction 330 has, as inputs, the contract funds from the counterparties 302. Also in an embodiment, the counterparty transaction 330 has a separate output for each amount payable to one or both of An example of the conditions in the counterparty transaction 320 for the example use case can be seen in table 3.

TABLE 3

| TxC | Result |
| --- | --- |
| Inputs: | Inputs: $C_1 \rightarrow$ 10 DA |
| | $C_2 \rightarrow$ 2 DA |
| Output #1: | 10 DA |
| | $Sig(PKC_1)$ AND $Sig(IPK_R^1)$ |
| | $\rightarrow$ Pay to $C_1$ if Condition 1 |
| | OR |
| | $Sig(PKC_2)$ AND $Sig(IPK_R^2)$ |
| | $\rightarrow$ Pay to $C_2$ if Condition 2 |
| | OR |
| | $Sig(PKC_2)$ AND time > June 2018 |
| | $\rightarrow$ Refund to $C_2$ if timeout |
| Output #2 | 2 DA |
| | $Sig(PKC_1)$ AND $Sig(IPK_R^1)$ |
| | $\rightarrow$ Pay to $C_1$ if Condition 1 |
| | OR |
| | $Sig(PKC_1)$ AND $Sig(IPK_R^2)$ |
| | $\rightarrow$ Pay to $C_1$ if Condition 2 |
| | OR |
| | $Sig(PKC_1)$ AND time > June 2018 |
| | $\rightarrow$ Refund to $C_1$ if timeout |

A script for the example use case can be seen in table 4.

TABLE 4

| | | |
| --- | --- | --- |
| | Number of inputs | 2 |
| Input 1 | Previous Transaction Hash | $C_1$ (Client) premium UTXO |
| | Previous transaction Output Index | |
| | Signature script [P2PKH] | < $C_1$ signature> < $C_1$ public key> |
| | Sequence number | |
| Input 2 | Previous Transaction Hash | $C_2$ (Insurer) pay-out UTXO |
| | Previous Transaction Output Index | |
| | Signature script [P2PKH] | < $C_2$ signature> < $C_2$ public key> |
| | Sequence number | |
| | Number of outputs | 2 |
| Output 1 | Value | 10 |
| | Public key script | 2 <PKC1> <IPKR1> 2 OP_CHECKMULTISIG OP_NOTIF 2 <PKC2> <IPKR2> 2 OP_CHECKMULTISIG OP_NOTIF <Timeout> OP_CHECKLOCKTIMEVERIFY OP_DROP <PKC2> OP_CHECKSIG OP_ENDIF OP_ENDIF |
| Output 2 | Value | 2 |
| | Public key script | 2 <PKC1> <IPKR1> 2 OP_CHECKMULTISIG OP_NOTIF 2 <PKC1> <IPKR2> 2 OP_CHECKMULTISIG OP_NOTIF <Timeout> OP_CHECKLOCKTIMEVERIFY OP_DROP <PKC1> OP_CHECKSIG OP_ENDIF OP_ENDIF |
| Locktime | | 0 | the counterparties 302 depending on the contract outcome (e.g., each unique value of $X_j^i$). Thus, each of these UTXOs distributes to the respective counterparty dependent on the conditions and timeout conditions. It must also be noted that, in some examples, the output could be constructed to pay to a third party that is not a member of the counterparties 302. In some embodiments, the output constraint is implemented as 2-of-2 multi-signature functions.

In an embodiment, the coordination algorithm transaction 332 has, as inputs, the N UTXOs from each of the member deposits and the UTXO making up the distribution from the counterparties. In some embodiments, there are two UTXOs: one that can be unlocked with a signature from the group public key (GPK) containing the deposits and the other containing the distribution that can also be unlocked with a signature from GPK or by a counterparty signature after a timeout, as described in the context of FIG. 4.

In embodiments, a threshold number of group members can cooperate to generate a signature corresponding to the group private key (GPriv) without explicitly determining GPriv. In embodiments, the signature would be indistinguishable from a signature produced directly from GPriv, but would actually be produced directly from the private key shares (GPriv$_j$) via the threshold signature scheme. In this manner, GPriv need not be determined at any point, but a signature corresponding to it can be determined from a threshold number of the private key shares (GPriv$_j$).

In these embodiments, a threshold of the group members agree (and jointly generate a signature) to transfer the first UTXO (the deposits). In these embodiments, the threshold number of group members can also cooperate to generate a signature to claim the distribution, but produce an additional signature corresponding to one of the outcome private keys. In such embodiments, if the group members are unable to reconstruct one of the outcome private keys by reaching consensus, they cannot claim the distribution, and the distribution will be returned to the counterparty(ies) after the timeout.

Note that, in some embodiments, the group members may be able to check whether a threshold of their private key shares (GPriv$_j$) would generate a valid signature corresponding to (GPK) at any time (e.g., as part of the dealer-free secret sharing protocol) without reconstructing the full private key. In such embodiments, a threshold number of group members may also be able to reclaim the deposits back at any time, but would forfeit the distribution if they did not perform their role in also producing the winning outcome key. An example of the inputs and outputs of the coordination algorithm transaction 332 for the example use case can be seen in table 5.

TABLE 5

| TxS | Result |
|---|---|
| Inputs: | $C_2 \rightarrow 0.2$ DA |
|  | $\quad P_1 \rightarrow 0.1$ DA |
|  | . |
|  | . |
|  | . |
|  | . |
|  | $\quad P_{10} \rightarrow 0.1$ DA |
| Outputs: | 1 DA |
|  | $\quad$ Sig(GPK) |
|  | 0.2 DA |
|  | Sig(GPK) AND |
|  | $\quad$ [Sig(IPK$^1$) OR Sig(IPK$^2$)] |
|  | $\quad$ OR |
|  | $\quad$ Sig(PKC$_2$) AND time > |
|  | June 2018 $\quad \rightarrow$ Refund |
|  | distribution to $C_2$ if timeout |

In an embodiment, the coordination algorithm transaction 332 is signed by the counterparties 302 that provide the distribution, and is then sent to the member group to be signed by each of the members 304 in turn. In the embodiment, once each input is signed, the coordination algorithm transaction 332 is broadcast to the blockchain network. Note that, in some embodiments, until the coordination algorithm transaction 332 is signed, any participant can quit the protocol (or fail to cooperate) and no funds are at risk. In an embodiment, once the coordination algorithm transaction 332 has been confirmed on the blockchain, each counterparty then signs their respective inputs to counterparty transaction 330 and broadcasts it to the blockchain network.

In the embodiment, once the counterparty transaction 330 is confirmed in the blockchain, the counterparty contract may be active.

Contract Execution

In an embodiment, after the counterparty transaction 330 is confirmed, the members 304 wait until after a time period specified in the conditions/items in the request 308 has expired. In an embodiment, the members 304 then utilize a separate blockchain, such as a ghost chain, to record their votes. In some examples, a "ghost chain" refers to a proof-of-stake blockchain that is mined by the group of members whose deposits are committed to the coordination algorithm transaction via the group key (GPK). That is, unlike proof-of-work based blockchains (e.g., Bitcoin), where transactions are validated by mining nodes interested in distributions awarded for performing work, in the ghost chain proof-of-stake blockchain, participants may be interested to reclaim a deposit (e.g., their "stake" of some amount of their own digital asset) made in the ghost chain.

In contrast to a traditional blockchain, the ghost chain can be configured to terminate, disappear, and/or expire upon performance or satisfaction of one or more criteria, goal or designated purpose. That is, in some embodiments, the ghost chain is a single-purpose blockchain that is no longer used once its purpose has been achieved. In some embodiments, the ghost chain includes an initial block (also referred to as a "genesis block"), which is created when the ghost chain is deployed or created for its purpose, criteria, or goal.

In some embodiments, a proof-of-stake consensus algorithm employed by the ghost chain can have the properties of regular block times, timestamped blocks and low forking probability. In some embodiments, the block distributions ("mining amounts") are paid from the distribution (F) at a pre-determined rate. In some embodiments, the mining distributions can be low due to the negligible cost of validating blocks. Note that, in some embodiments, the coordination algorithm can be played entirely on a blockchain (i.e., instead of a ghost chain) with a coordination algorithm transaction, given a sufficient scripting capability and blockchain-aware single payment verification (SPV) proofs. An example of such a blockchain platform is Ethereum.

In an embodiment, the ghost chain blocks are generated with an interval of $\Delta T$, which, in some cases, is specified in the request. In some embodiments, the value of $\Delta T$ is chosen based on the desired speed of resolution of the contract and the desired response time from the members 304. In an embodiment, each of the members 304 reaches a determination of the result sought by the counterparty contract. Using the example use case given above, each of the members 304 makes a determination whether a hard frost occurred in the month of April 2018. Allowing for the possibility that not all of the members 304 may arrive at the same determination (e.g., some of the members could have incorrect information or could accidentally or intentionally submit the wrong answer), only a threshold M of the members 304 need arrive at the same determination in order for the determination to be accepted as the result.

Figure 4:
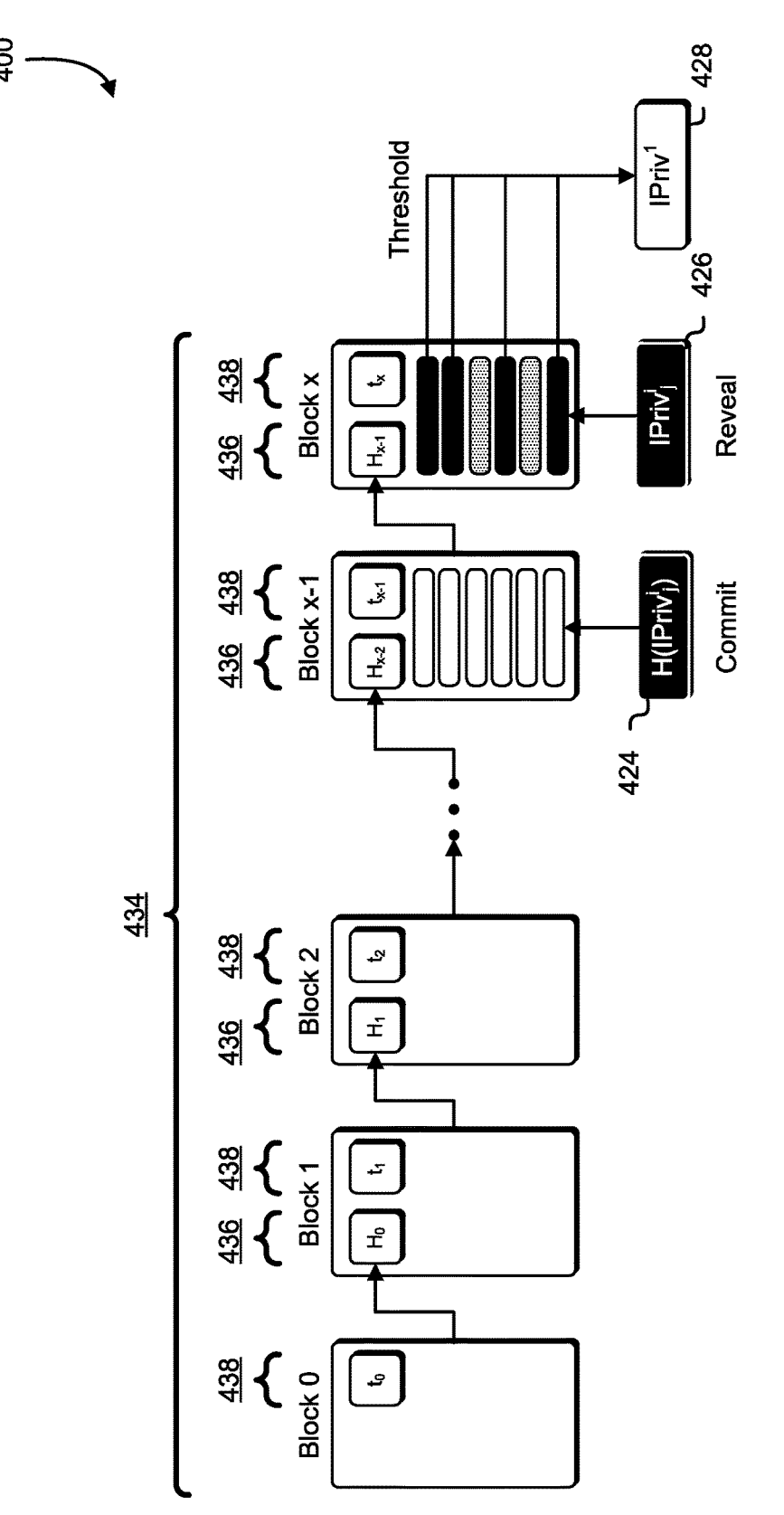
FIG. 4 illustrates an example of coordinating the outcome determination in accordance with an embodiment.

FIG. 4 illustrates an example embodiment 400 of the present disclosure. Specifically, FIG. 4 depicts a high-level schematic of a smart contract set-up of an embodiment of the present disclosure. As can be seen, FIG. 4 includes transactions 438 that are committed to a ghost chain 434 at intervals. In some embodiments, the ghost chain 434 may be a temporary proof-of-stake sidechain created to record votes in the coordination algorithm. In some embodiments, the transactions 438 are blockchain transactions mined to the blocks of the ghost chain 434. In some embodiments, each successive block includes hashes 436 that are cryptographic hashes of previous blocks in the ghost chain. The hashes 436 link the blocks in the ghost chain 434.

In embodiments, a commitment scheme enables a member to commit to a particular value in advance while keeping the value hidden to others. Once the value has been committed to, it can be revealed at a later stage. In this manner, a member of the group cannot change a value after they have committed to it, but the value is not revealed to the other members, and in this way can be used as secure voting protocol.

In general, a commitment scheme can occur in two phases: a commit phase where the value is chosen and committed by the member, and the reveal phase where the value is revealed by the member and confirmed to be consistent with the commit. In general, a secure commitment scheme may rely on random blinding nonces to prevent any information about the committed values being revealed after the commit phase. However, in the present disclosure, the committed values may already be randomly generated keys. Consequently, the commitment protocol can be reduced to simply employing a secure hash function.

Therefore, in an anonymous voting protocol of the present disclosure: in the commit phase, each member hashes (e.g., using SHA256) the value they wish to commit to and reveals the hash to the group, and in the reveal phase, each member then reveals the hash pre-image (committed value) to the group and the group verifies each hash. In this way a group can commit to a vote without knowing in advance how any of the rest of the group is voting.

Thus, in an embodiment, at a block height ($h_B$) specified in the request, each of the members (e.g., the members 304 of FIG. 3) submit a commit 424 to the private key share of the condition/item public key that corresponds to the contract result they have individually determined (private key share/$Priv_j^i$ of member j for the ith condition). In an embodiment, each member signs their respective commit 424 and the commits are mined into the ghost chain. In embodiments, each commit can be a simple hash (e.g., Secure Hash Algorithm (SHA) 256) of the respective member's private key share that corresponds to the result determined: by hashing the private key share, each member's vote is kept secret until the reveal stage described below. In this manner, the risk of one member's vote influencing another member's vote is minimised.

In an embodiment, each member then submits the key share 426 they committed to ($IPriv_j^i$), which is then mined into the next block ($h_B$+1). In some embodiments, the key share 426 held by each group member is a share, determined according to a secret sharing scheme such as described above, of a full private key. In such a secret sharing scheme, obtaining at least a threshold number of the key shares 426 can allow the full private key 428 to be mathematically determined. In an embodiment, once this block is validated, if a threshold of members has submitted key shares corresponding to one particular outcome, then the winning full private key 428 ($IPriv^w$) corresponding to the winning outcome public key ($IPK^w$) (e.g., one of the separate public keys 314 of FIG. 3) can be easily determined and is publically revealed (w being the winning outcome index). In some embodiments, the winning full private key 428 is a cryptographic key that is a counterpart to the winning public key (e.g., one of the separate public keys 314) sent to the counterparties and encoded within the smart contract transaction.

In the example embodiment, the commit height ($h_B$) is block x–1, and the committed key shares 426 (the share of the outcome private key for member j) are revealed at block x. After the reveal, a threshold number of winning private key shares enables the winning full private key 428 to be determined.

Figure 5:
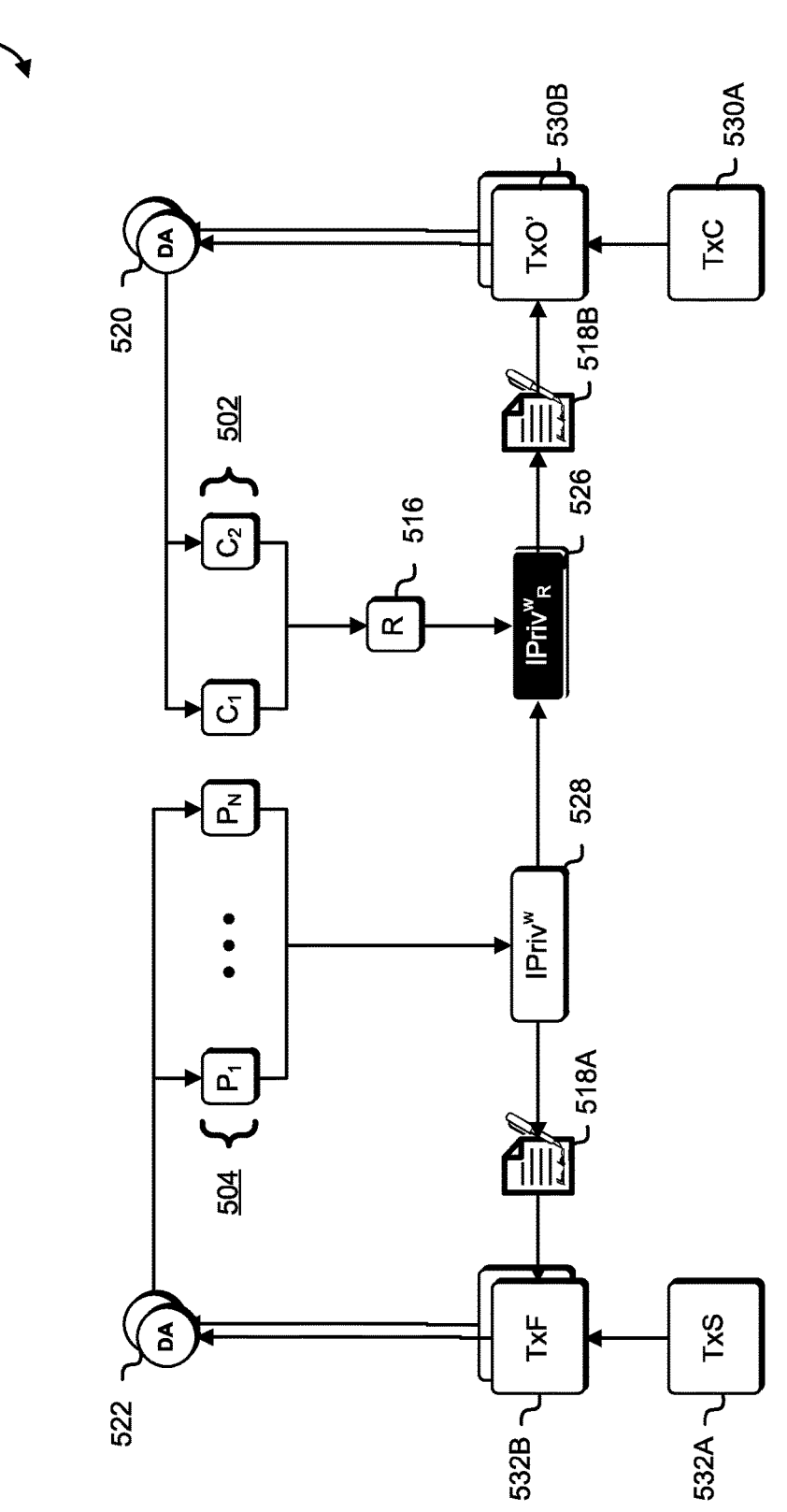
FIG. 5 illustrates an example of smart contract execution in accordance with an embodiment.

FIG. 5 illustrates an example embodiment 500 of the present disclosure. Specifically, FIG. 5 depicts a high-level schematic of execution of the smart contract set-up in FIG. 3 after the outcome is determined per FIG. 4. The example embodiment 500 includes counterparties 502 that collect an amount of a digital asset 520 in accordance with the outcome associated with a winning full private key 528 by signing an outcome transaction 530B that unlocks a counterparty transaction 530A. The example embodiment 500 further includes members 504 of a group that collects distribution(s) and deposits via outputs 522 by signing distribution transaction 532B that unlocks a coordination algorithm transaction 532A as a distribution for providing a winning full private key 528 to the counterparties 502.

In some embodiments, the counterparties 502 are similar to the counterparties 202 of FIG. 2. In some embodiments, the members 504 are similar to the members 204 of FIG. 2. In some embodiments, signatures 518A are the collective digital signatures of the members 504 in order for each to receive their distribution and deposit. In some embodiments, signatures 518B are the digital signatures of the counterparties and the digital signature generated using the complete outcome signing key 526, formed by combining the winning full private key 528 and the random blinding nonce 516.

In some embodiments, the winning full private key 528 is similar to the winning full private key 428 of FIG. 4. In some embodiments, the random blinding nonce 516 is the same as the nonce generated in 612 of FIG. 6 to obfuscate the contract condition public keys. In some embodiments, the complete outcome signing key 526 is the winning full private key 428 combined with the random blinding nonce 516 using elliptic curve arithmetic such that the outcome of the smart contract can be determined by matching the complete outcome signing key 526 to its counterpart contract condition public key in the smart contract in the counterparty transaction 530A locking script.

In some embodiments, the digital asset 520 is a distribution, in accordance with the winning outcome of the smart contract, of digital assets previously locked in the counterparty transaction 530A upon validation of the signatures 518B. In some embodiments, the outputs 522 reflect digital assets previously locked in at least one coordination algorithm transaction payable to the members 504 upon validation of the signatures 518A. In some embodiments, the counterparty transaction 530A is a blockchain transaction, similar to the counterparty transaction 330 of FIG. 3, that includes a smart contract, such as the smart contract 206 of FIG. 2. In some embodiments, the outcome transaction 530B is a blockchain transaction that is created to redeem/claim the appropriate digital asset of the counterparty transaction 530A in accordance with the determined outcome of the smart contract.

In some embodiments, the coordination algorithm transaction 532A is a blockchain transaction, similar to the coordination algorithm transaction 332 of FIG. 3, containing the distribution and the deposits 522 of the members 504. In some embodiments, the distribution transaction 532B is a blockchain transaction created by the members 504 in order to claim their deposits and distribution. As a result of determining the winning full private key 428 in FIG. 4, the members that committed to a winning private key share are determinable. In an embodiment, the ghost chain consensus algorithm identifies the "winning" members (i.e., the members who voted with the consensus), and a distribution transaction 532B (TxF) is created by the group, for the group, or by a member of the group to pay the distribution (F) to the winning members, signed using GPK by a threshold (m) of members (e.g., via the threshold signature scheme). In embodiments, members embed the winning full private key 428 in the metadata of the distribution transaction 532B.

In some embodiments, the deposits of the members are also reimbursed as a result of validating the distribution transaction 532B. In some embodiments, the deposits of the members 504 are committed to a different transaction from the coordination algorithm transaction 532A. In some of those embodiments, a refund transaction (TxD) is created by the group, for the group, or by a member of the group to refund the deposits of each member. In some embodiments, members that break certain ghost chain consensus rules will have their deposits distributed among the other members. In embodiments, the distribution transaction and the refund transaction are then broadcast to the blockchain network.

Using the use case described above where client and insurer agreed upon an insurance contract to insure the client against the possibility of a hard frost at his vineyard at any time during April 2018 as an example, a member group instantiates a ghost chain on the first day of May 2018, with a block generation time of $\Delta T=1$ day. In the use case example, $h_B$ is set to 5, and as a result, on the fifth day of May, the members (e.g., the members 304 of FIG. 3) submit their signed commitments (e.g., commit 424) on the fifth day of May. The following $\Delta T$, on the sixth day of May, each of the members submits the key share (e.g., 426) to reveal their commitment.

In an example use case, 9 of 10 members 504 committed their share of $IPK^1$ and 1 of the members 504 committed their share of $IPK^2$ (e.g., the dissenting member's source of information was in error). In the example, the member group determines that $IPriv^1$ can be reconstructed from a threshold (6) of the commitments, and then can identify which members committed to a winning share (9). In an embodiment, a threshold of the member group (a sub-set of winners) can then create and collectively sign (signatures 518A) a transaction 532 paying the distribution to the 9 winners and returning all the member deposits (fee and deposits 522). Counterparty Group In an embodiment, a winning full private key 528 (e.g., the winning full private key 428 of FIG. 4) ($IPriv^w$) corresponding to a winning outcome public key ($IPK^w$) is revealed by the member group. In an embodiment, either of the counterparties 502 (e.g., the counterparties 302 of FIG. 3), or the "winning" counterpart (v/ies), add the random blinding nonce 516 to this value to obtain the complete outcome signing key 526:

$$IPriv_R{}^w = IPriv^w + R_B$$

Figure 6:
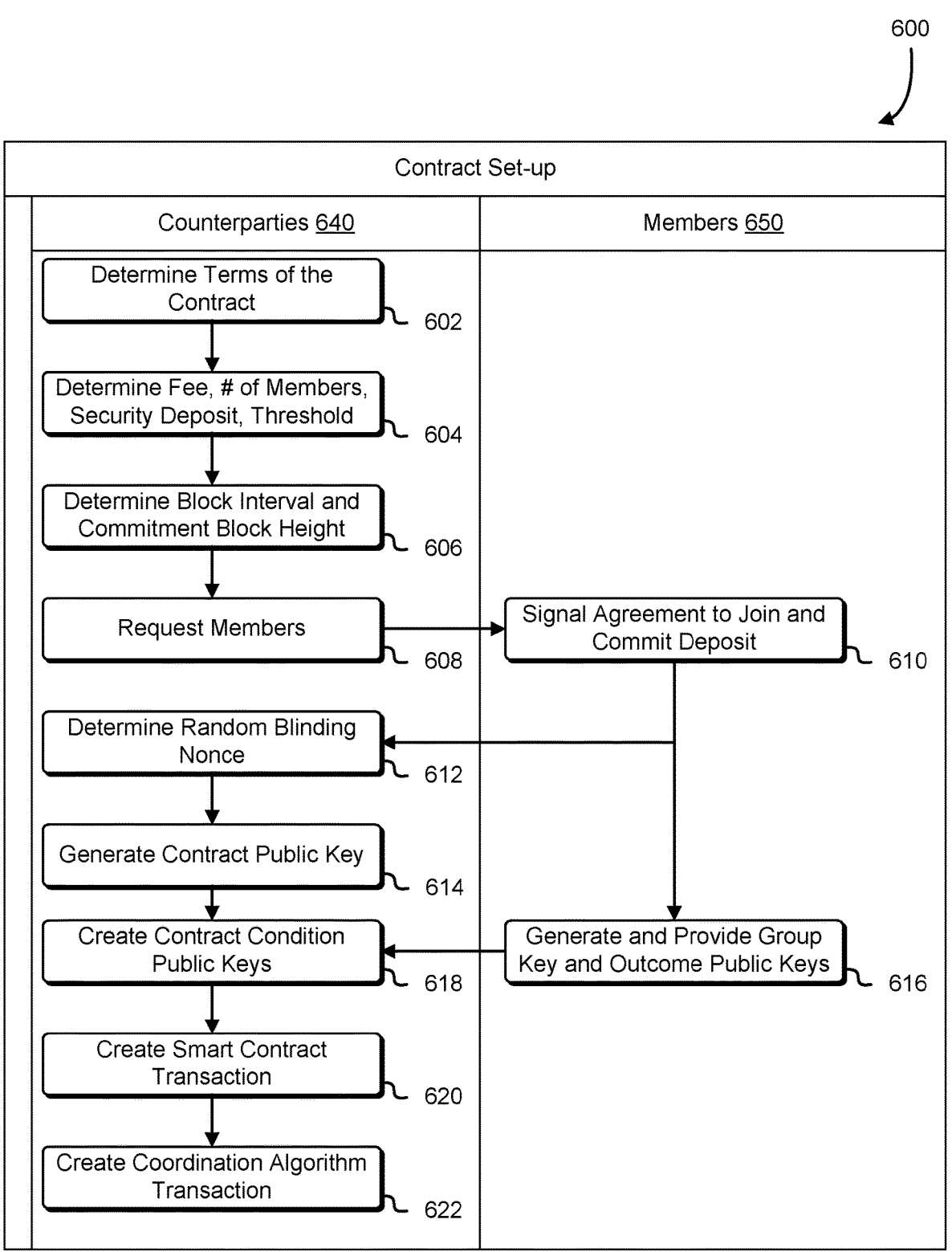
FIG. 6 is a swim diagram that illustrates an example of creating a smart contract and coordination algorithm transaction in accordance with an embodiment.

In the embodiment, this value can then be used by the "winning" counterparty (ies) 502 to produce signatures 518B (along with signatures from their own public keys) to claim outputs 522 of a counterparty transaction 530A (e.g., the counterparty transaction 330 of FIG. 3) corresponding to the winning outcome. In the example use case, the counterparties learn of the winning full private key 528 that the coordination algorithm has produced ($IPriv^1$) by determining from the members' consensus that an outcome of a hard frost objectively occurred. As a result, the insurance contract transfers a distribution. In the example use case, each of the counterparties 502 (e.g., each of the counterparties 302) adds the random blinding nonce 516 ($R_B$) to $IPriv^1$ to obtain the complete outcome signing key 526 ($IPriv_R{}^1$). This value can then be used with each counterparty's private key to produce the signatures 518B to transfer the corresponding outputs 522B of the counterparty transaction 530A:

Output #1:10 DA
   $Sig(PKC_1)$ AND $Sig(IPK_R{}^1) \rightarrow$ Distribution to $C_1$
Output #2:2 DA
   $Sig(PKC_2)$ AND $Sig(IPK_R{}^1) \rightarrow$ Premium to $C_2$ FIG. 6 is a swim diagram illustrating an example of a process 600 for creating a smart contract and coordination algorithm transaction in accordance with various embodiments. Some or all of the process 600 (or any other processes described, or variations and/or combinations of those processes) can be performed under the control of one or more computer systems configured with executable instructions and/or other data, and may be implemented as executable instructions executing collectively on one or more processors. The executable instructions and/or other data can be stored on a non-transitory computer-readable storage medium (e.g., a computer program persistently stored on magnetic, optical, or flash media).

For example, some or all of process 600 can be performed by one or more computing devices (e.g., by a server in a data centre, by a client computing device, by multiple computing devices in a distributed system of a computing resource service provider, or by any suitable electronic client device such as the computing device 800 of FIG. 8). The process 600 includes a series of operations wherein two or more counterparties agree on requirements for a smart contract and parameters of a coordination algorithm transaction, engage with a group of members for determining an outcome of the smart contract, and create the smart contract and the coordination algorithm transaction.

In some embodiments, in 602, two or more counterparties, such as the counterparties 202 of FIG. 2, determine the parameters of the smart contract. For example, the counterparties may come to agreement on an amount of a digital asset (e.g., Bitcoin) that each of the counterparties will commit to the smart contract transaction, a set of conditions, and amounts of digital assets to pay out and to whom they pay out, upon fulfilment of each of the conditions. As a more specific example, an agreement is reached between three counterparties (Alice, Bob, and Carol) whereupon Alice will commit an amount $X_1$, Bob will commit an amount $X_2$, and Carol will commit an amount $X_3$ of digital assets to the smart contract transaction.

In the example, the set of agreed-upon conditions are that in the event a first condition is met, Alice receives 60% of the committed digital assets, Bob receives 30% of the committed digital assets, and Carol receives the remaining 10% of the committed digital assets of the smart contract. Alternatively, if a second condition is met, Bob and Carol each get 50% of the committed digital assets (and Alice gets none). Still alternatively, if a third condition is met, Alice's husband Ted (who has not committed any digital assets to the smart contract) inherits 100% of the digital assets of the smart transaction. As a fourth condition, in the event the first, second, and third conditions are unmet during a specified time frame, Bob, Carol, and Alice can have their committed digital assets refunded.

In some embodiments, in 604, the counterparties determine the characteristics of the members that will act as a group oracle to determine which of the conditions are fulfilled. That is, the counterparties come to agreement upon how much of a digital asset to offer as a distribution to provide a reason for the members to agree to participate in determining the outcome, the number of members needed for the group, how much each of the members must commit as a security deposit, and a threshold for the number of matching votes to qualify as a consensus. As an example, Bob, Carol, and Alice agree to offer 10 units of a digital asset to each of up to 10 members of a group that agree on a particular outcome of the smart contract, with at least 6 answers from the group having to match in order to be considered the consensus answer. In the example, Bob, Carol, and Alice will require that each member of the group commits 0.1 units of a digital asset as collateral.

In some embodiments, in 606, the counterparties determine the timing parameters of the coordination algorithm transaction, such as block height and block interval of a ghost chain to which the group members will commit their answers. For example, if the block height (e.g., a number of blocks to be in the blockchain) is specified to be five and the block interval is specified to be one day, starting at a particular time, that gives the group members five days (1 day×5) after the start time to submit their decision: at the fifth block, the group members submit their signed commitment, and the following day they reveal their commitments.

In some embodiments, in 608, the counterparties submit a request for group members, similar to the request 308 of FIG. 3. That is, the request can include information, such as definitions of the contract conditions, the offered distribution, number of members sought, an amount of a security deposit required per member, the required threshold of matching votes for the consensus answer, the ghost chain block interval and the commitment block height ($h_B$). As noted, the request may be submitted/posted on any forum or communication medium suitable for submitting/posting such requests, such as a website forum, bulletin board, peer-to-peer application, or online marketplace.

In some embodiments, in 610, the members of the group signal their agreement to participate in determining the outcome of the smart contract. In some embodiments, signalling of the agreement is done through a same or similar forum as the forum to which the request was submitted/posted. In other embodiments, signalling of agreement is performed through direct communication to one or more of the counterparties (e.g., via a communications link in the request).

In some embodiments, in 612, after receiving notice that the group membership requirements have been met, the counterparties generate a random blinding nonce with which to obfuscate the outcomes in the smart contract transaction. The random blinding nonce may be determined in a variety of ways. For example, one counterparty could generate the random blinding nonce and the other party or parties could signal approval/assent to the one party. Alternatively, each party could generate a portion of the random blinding nonce, and all of the generated portions could be combined according to a mathematical algorithm to form the random blinding nonce.

In some embodiments, in 614, the counterparties generate/agree upon a public key, similar to contract public key 316 of FIG. 3, for the smart contract In embodiments, the public key corresponds to the random blinding nonce (e.g., where the blinding nonce is the private key, and the public key is the elliptic curve public key to the blinding nonce). In some embodiments, the contract public key will be combined with each of the outcome public keys generated by the members in 616. As noted, in 616, the group members generate a group public key and, for each of the contract outcomes, an outcome public key. As noted, group public key and the outcome keys may be created using a dealer-free secret sharing protocol as described above. Each group member may have a private key share that corresponds to the outcome public key. The private key share may be generated using a secret sharing protocol as described in the present disclosure using the threshold for the number of matching votes specified by the counterparties in 604 of FIG. 6 as the number of key shares needed to recreate the full private key that corresponds to the outcome public key of the winning outcome. In the embodiments, the group members provide the group public key and the outcome public keys to the counterparties via the communication medium established in 608-12.

In some embodiments, in 618, at least one of the counterparties create the contract condition public keys by combining each of the outcome public keys generated by the member group in 616 with the random blinding nonce generated in 612. In this manner, the contract condition public keys are disguised in the smart contract transaction created in 620 from the group members. As noted, in some embodiments in 620, the smart contract transaction is created and signed by the counterparties and committed to the blockchain with the funds (e.g., amount of digital asset) each of the counterparties agreed upon. The smart contract transaction may have a separate UTXO for each amount payable to one or both counterparties, depending on the contract outcome.

Finally, in some embodiments in 622, the counterparties create the coordination algorithm transaction, similar to the coordination algorithm transaction 332 of FIG. 3. In some embodiments, the coordination algorithm transaction may include, as a UTXO, the deposits from the group members, which may be disbursed with a signature from the group public key, generated by the member group in 616, after the group members have submitted their answers or after a timeout. In some embodiments, the coordination algorithm transaction may additionally or alternatively include the distribution offered by the counterparties that too can be unlocked with a signature of using the group public key or by a counterparty signature after a timeout. In some embodiments, the UTXOs may be in the same coordination algorithm transaction, whereas in other embodiments, the UTXOs may be in separate transactions. Note that one or more of the operations performed in 602-22 can be performed in various orders and combinations, including in parallel.

Figure 7:
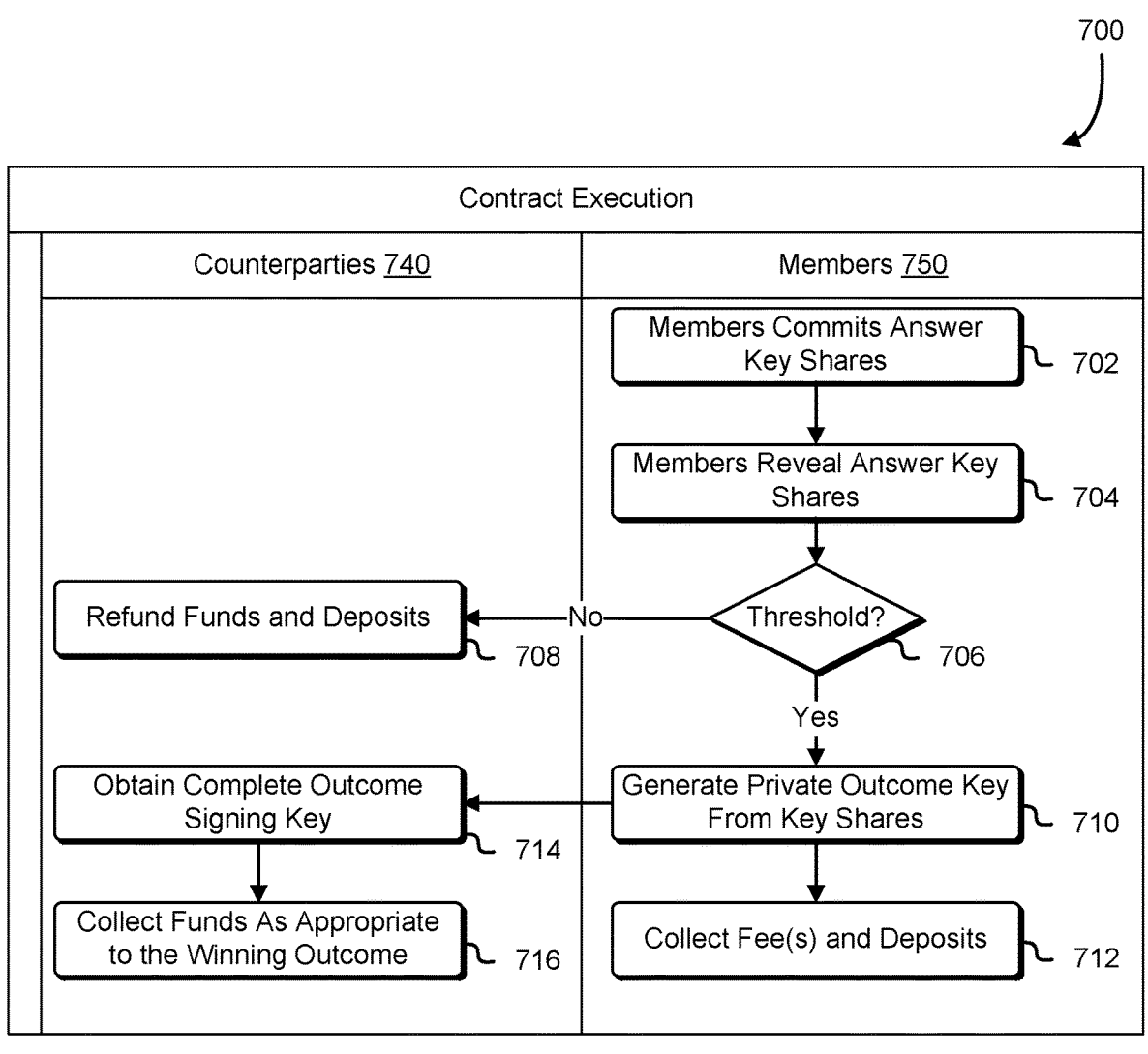
FIG. 7 is a swim diagram that illustrates an example of executing a smart contract in accordance with an embodiment.

FIG. 7 is a swim diagram illustrating an example of a process 700 for executing a smart contract in accordance with various embodiments. Some or all of the process 700 (or any other processes described, or variations and/or combinations of those processes) can be performed under the control of one or more computer systems configured with executable instructions and/or other data, and may be implemented as executable instructions executing collectively on one or more processors. The executable instructions and/or other data can be stored on a non-transitory computer-readable storage medium (e.g., a computer program persistently stored on magnetic, optical, or flash media).

For example, some or all of process 700 can be performed by one or more computing devices (e.g., by a server in a data centre, by a client computing device, by multiple computing devices in a distributed system of a computing resource service provider, or by any suitable electronic client device such as the computing device 800 of FIG. 8). The process 700 includes a series of operations wherein members commit and reveal their answer key shares and, if a threshold of matching answers are present, a private outcome key associated with the consensus answer can be determined and from which the complete outcome signing key can be calculated.

In some embodiments, after the start time commences, each of the group members makes a determination within a particular time frame as to the smart contract outcome. The particular time frame may be dependent upon factors such as the block height and the block interval of a ghost chain, such as the ghost chain 434 of FIG. 4. In the example above, a block height of five and a block interval of one day gives the group members five days to determine their answers.

At the end of the time period, in some embodiments, in 702, each of the group members commits the key share that corresponds to their own determined answer to a block in the ghost chain, shown as the commit 424 of FIG. 4. As noted above, each group member may submit the answer as a simple hash (e.g., SHA-256) of the group member's key share of the particular answer. Note that in some embodiments, not all of the group members need submit their answers in the same block. For example, if a group member arrives at his/her answer on the third out of five days, that group member may submit their answer in the third block.

In some embodiments, in 704, in the next block in the ghost chain the members reveal their commitment, shown as the reveal 426 of FIG. 4, which can be verified by comparing a hash of the reveal with the hash of the previous commit. In some embodiments, in 706, a determination is made whether the number of key shares are sufficient to construct the private key that corresponds to a valid outcome private key. If not, in 708, the counterparties may reclaim their funds and the members may be refunded their deposits. In such a case, in some embodiments, members may not receive a distribution, or may receive a lesser distribution, since no consensus answer was reached.

Otherwise, in some embodiments, in 710, the winning outcome private key is generated. The members that submitted winning answers can collectively sign a transaction, such as the distribution transaction 532B of FIG. 5, created to collect the distributions and return the member deposits in 712. The winning outcome private key may be provided by the group to the counterparties, who in 714, may combine the winning outcome private key with the random blinding nonce determined in 612 of FIG. 6 to produce the complete outcome signing key (e.g., the complete outcome signing key 526 of FIG. 5).

In some embodiments, in 716, each of the counterparties can sign an outcome transaction, similar to the outcome transaction 520B, using signatures generated using their own private keys and a signature generated using the complete outcome signing key, thereby claiming the funds appropriate to the outcome of the smart contract as agreed upon in 602 of FIG. 6. Note that one or more of the operations performed in 702-16 can be performed in various orders and combinations, including in parallel.

Note that in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

FIG. 8 is an illustrative, simplified block diagram of a computing device 800 that can be used to practice at least one embodiment of the present disclosure. In various embodiments, the computing device 800 can be used to implement any of the systems illustrated and described above. For example, the computing device 800 can be configured for use as a data server, a web server, a portable computing device, a personal computer, or any electronic computing device. As shown in FIG. 8, the computing device 800 could include one or more processors 802 that, in embodiments, are configured to communicate with and are operatively coupled to a number of peripheral subsystems via a bus subsystem 804. In some embodiments, these peripheral subsystems include a storage subsystem 806 comprising a memory subsystem 808 and a file/disk storage subsystem 810, one or more user interface input devices 812, one or more user interface output devices 814, and a network interface subsystem 816. Such storage subsystem 806 could be used for temporary or long-term storage of information.

In some embodiments, the bus subsystem 804 provides a mechanism for enabling the various components and subsystems of computing device 800 to communicate with each other as intended. Although the bus subsystem 804 is shown schematically as a single bus, alternative embodiments of the bus subsystem utilize multiple busses. In some embodiments, the network interface subsystem 816 provides an interface to other computing devices and networks. The network interface subsystem 816, in some embodiments, serves as an interface for receiving data from and transmitting data to other systems from the computing device 800. In some embodiments, the bus subsystem 804 is utilised for communicating data such as details, search terms, and so on.

In some embodiments, the user interface input devices 812 includes one or more user input devices such as a keyboard: pointing devices such as an integrated mouse, trackball, touchpad, or graphics tablet: a scanner: a barcode scanner: a touch screen incorporated into the display: audio input devices such as voice recognition systems, microphones; and other types of input devices. In general, use of the term "input device" is intended to include all possible types of devices and mechanisms for inputting information to the computing device 800. In some embodiments, the one or more user interface output devices 814 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 800. The one or more user interface output devices 814 can be used, for example, to present user interfaces to facilitate user interaction with applications performing processes described and variations therein, when such interaction may be appropriate.

In some embodiments, the storage subsystem 806 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 806. These application modules or instructions can be executed by the one or more processors 802. In various embodiments, the storage subsystem 806 additionally provides a repository for storing data used in accordance with the present disclosure. In some embodiments, the storage subsystem 806 comprises a memory subsystem 808 and a file/disk storage subsystem 810.

In embodiments, the memory subsystem 808 includes a number of memories, such as a main random access memory (RAM) 818 for storage of instructions and data during program execution and/or a read only memory (ROM) 820, in which fixed instructions can be stored. In some embodiments, the file/disk storage subsystem 810 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 800 includes at least one local clock 824. The local clock 824, in some embodiments, is a counter that represents the number of ticks that have transpired from a particular starting date and, in some embodiments, is located integrally within the computing device 800. In various embodiments, the local clock 824 is used to synchronize data transfers in the processors for the computing device 800 and the subsystems included therein at specific clock pulses and can be used to coordinate synchronous operations between the computing device 800 and other systems in a data centre. In another embodiment, the local clock is a programmable interval timer.

The computing device 800 could be of any of a variety of types, including a portable computer device, tablet computer, a workstation, or any other device described below. Additionally, the computing device 800 can include another device that, in some embodiments, can be connected to the computing device 800 through one or more ports (e.g., USB, a headphone jack, Lightning connector, etc.). In embodiments, such a device includes a port configured to accept a fibre-optic connector. Accordingly, in some embodiments, this device is configured to convert optical signals to electrical signals that are transmitted through the port connecting the device to the computing device 800 for processing. Due to the ever-changing nature of computers and networks, the description of the computing device 800 depicted in FIG. 8 is intended only as a specific example for purposes of illustrating the preferred embodiment of the device. Many other configurations having more or fewer components than the system depicted in FIG. 8 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising", "having", "including", and "containing" are to be construed as open-ended terms (i.e., meaning "including, but not limited to") unless otherwise noted. The term "connected", when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset", unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C", or "at least one of A, B and C", unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like do not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

Summary

The novel techniques described and suggested in the present disclosure extend the functionality of the blockchain without disrupting the properties of the blockchain that ensure the integrity of the data stored within the blockchain data structure. For example, the techniques improve the field of computing, specifically in the field of digital record validation where conditions for validation are defined within blockchain transactions embedded in the records, by performing and executing a method for obtaining accurate and objective information regarding real world events in a trustless way on a blockchain. Additionally, techniques described and suggested in the present disclosure may improve the execution of smart contract within a blockchain computer network by utilizing a temporary proof-of-stake blockchain to manage the votes of participants tasked to act as a distributed trusted oracle for determining the smart contract outcome.

Moreover, techniques described and suggested in the present disclosure may be necessarily rooted in computer technology in order to overcome problems specifically arising with the risk of manipulation smart contract outcomes by obfuscating the smart contract from the participants tasked with determining the outcome, thereby maintaining privacy of the counterparties and removing reasons for the participants to collude to subvert the outcome protocol. Furthermore, by employing game theory concepts, such as Schelling coordination, the anonymous participants may be provided with a reason to provide accurate information into the protocol.

The invention claimed is:

1. A computer-implemented method comprising:

communicating, by at least one of a plurality of members, to a set of counterparties, assent to determine an outcome of a set of conditions, the set of conditions having a first possible outcome and a second possible outcome;

generating, by at least one of the plurality of members, using a secret sharing protocol, a first private key share corresponding to the first possible outcome and a second private key share corresponding to the second possible outcome;

transferring, by at least one of the plurality of members, an amount of a digital asset to an address associated with a first blockchain transaction;

cooperating in determining the outcome to be the first possible outcome, wherein a threshold number of said first private key shares is usable, at least in part, to determine the outcome;

revealing the first private key share within a particular time frame;

generating, based at least in part on the threshold number of first private key shares, a signature usable at least in part to validate a second blockchain transaction for unlocking the amount of the digital asset associated with the first blockchain transaction, wherein at least part of the amount of the digital asset associated with the first blockchain transaction is distributed to at least one of the plurality of members on the basis of said revealed first private key share; and causing the second blockchain transaction to be validated at a node in a blockchain network.

2. The computer-implemented method according to claim 1, wherein: the computer-implemented method further comprises:

generating a first public key associated with the first possible outcome and a second public key associated with the second possible outcome;

providing the first public key and the second public key to the set of counterparties;

the first private key share is usable to determine the outcome by: generating, at least in part using the first private key share, a first private key; and determining that the first private key is associated with the first public key.

3. The computer-implemented method according to claim 1, wherein the secret sharing protocol is a dealer-free secret sharing protocol.

4. The computer-implemented method according to claim 1, wherein:

the first blockchain transaction further includes a second amount of a second digital asset transferred from a subset of the set of counterparties; and the method further comprises transferring control of the second amount of the second digital asset further as a result of causing the second blockchain transaction to be validated.

5. The computer-implemented method according to claim 4, wherein:

the first blockchain transaction further includes a timeout condition; and as a result of fulfilment of the timeout condition, causing the second blockchain transaction to be validated transfers control of the second amount of the second digital asset to the subset of the set of counterparties.

6. The computer-implemented method according to claim 4, wherein:

validation of the second blockchain transaction includes validating a digital signature generated using a group cryptographic key, the group cryptographic key associated with a group of participants that have assented to determine the outcome;

the group of participants include:

a first subset of participants that reveal key shares corresponding to the first possible outcome; and a second subset of participants that reveal key shares corresponding to the second possible outcome; and transferring control of the second amount includes transferring control of the second amount to the first subset of participants, excluding the second subset of participants.

7. The computer-implemented method according to claim 1, wherein validation of the second blockchain transaction includes validating a digital signature generated using a group cryptographic key, the group cryptographic key associated with a group of participants that have assented to determine the outcome.

8. The computer-implemented method according to claim 7, wherein: the computer-implemented method further comprises:

generating a group public key associated with the group of participants;

providing the group public key to the set of counterparties;

the first blockchain transaction is created, at least in part, using the group public key; and the validation of the second blockchain transaction includes determining that the group cryptographic key is associated with the group public key of the first blockchain transaction.

9. The computer-implemented method according to claim 7, further comprising:

generating, using the secret sharing protocol, a group private key share; and further as a result of determining the outcome, generating the group cryptographic key based at least in part on the group private key share.

10. The computer-implemented method according to claim 7, wherein:

the first private key share belongs to a plurality of first private key shares distributed among the group of participants, the first private key shares corresponding to the first possible outcome; and determining the outcome to be the first possible outcome includes determining that a threshold number of the plurality of first private key shares have been revealed by the group of participants.

11. The computer-implemented method according to claim 1, wherein revealing the first private key share includes revealing the first private key share in a third blockchain transaction.

12. The computer-implemented method according to claim 11, wherein the third blockchain transaction is a transaction in a proof-of-stake blockchain.

13. The computer-implemented method according to claim 12, wherein:

the particular time frame is a second time frame; and revealing the first private key share further includes:

committing a cryptographic hash of the first private key share in a commit transaction within a first time frame, previous to the second time frame; and validating the third blockchain transaction includes determining that the first private key share in the third blockchain transaction corresponds to the cryptographic hash in the commit transaction.

14. A system, comprising:

a processor; and memory including executable instructions that, as a result of execution by the processor, causes the system to execute operations, the operations comprising:

communicating, by at least one of a plurality of members, to a set of counterparties, assent to determine an outcome of a set of conditions, the set of conditions having a first possible outcome and a second possible outcome;

generating, by at least one of the plurality of members, using a secret sharing protocol, a first private key share corresponding to the first possible outcome and a second private key share corresponding to the second possible outcome;

transferring, by at least one of the plurality of members, an amount of a digital asset to an address associated with a first blockchain transaction;

cooperating in determining the outcome to be the first possible outcome, wherein a threshold number of said first private key shares is usable, at least in part, to determine the outcome;

revealing the first private key share within a particular time frame;

generating, based at least in part on the threshold number of first private key shares, a signature usable at least in part to validate a second blockchain transaction for unlocking the amount of the digital asset associated with the first blockchain transaction, wherein at least part of the amount of the digital asset associated with the first blockchain transaction is distributed to at least one of the plurality of members on the basis of said revealed first private key share; and causing the second blockchain transaction to be validated at a node in a blockchain network.

15. The system of claim 14, wherein the operations further comprise:

generating a first public key associated with the first possible outcome and a second public key associated with the second possible outcome;

providing the first public key and the second public key to the set of counterparties;

the first private key share is usable to determine the outcome by: generating, at least in part using the first private key share, a first private key; and determining that the first private key is associated with the first public key.

16. The system of claim 14, wherein the secret sharing protocol is a dealer-free secret sharing protocol.

17. The system of claim 14, wherein:

the first blockchain transaction further includes a second amount of a second digital asset transferred from a subset of the set of counterparties; and the operations further comprise transferring control of the second amount of the second digital asset further as a result of causing the second blockchain transaction to be validated.

18. A non-transitory computer-readable storage medium having stored thereon executable instructions that, as a result of being executed by a processor of a computer system, cause the computer system to execute operations, the operations comprising:

communicating, by at least one of a plurality of members, to a set of counterparties, assent to determine an outcome of a set of conditions, the set of conditions having a first possible outcome and a second possible outcome;

generating, by at least one of the plurality of members, using a secret sharing protocol, a first private key share corresponding to the first possible outcome and a second private key share corresponding to the second possible outcome;

transferring, by at least one of the plurality of members, an amount of a digital asset to an address associated with a first blockchain transaction;

cooperating in determining the outcome to be the first possible outcome, wherein a threshold number of said first private key shares is usable, at least in part, to determine the outcome;

revealing the first private key share within a particular time frame;

generating, based at least in part on the threshold number of first private key shares, a signature usable at least in part to validate a second blockchain transaction for unlocking the amount of the digital asset associated with the first blockchain transaction, wherein at least part of the amount of the digital asset associated with the first blockchain transaction is distributed to at least one of the plurality of members on the basis of said revealed first private key share; and causing the second blockchain transaction to be validated at a node in a blockchain network.

19. The non-transitory computer-readable storage medium of claim 18, wherein the operations further comprise:

generating a first public key associated with the first possible outcome and a second public key associated with the second possible outcome;

providing the first public key and the second public key to the set of counterparties;

the first private key share is usable to determine the outcome by: generating, at least in part using the first private key share, a first private key; and determining that the first private key is associated with the first public key.

20. The non-transitory computer-readable storage medium of claim 18, wherein the secret sharing protocol is a dealer-free secret sharing protocol.

* * * * *